US012518881B2

(12) United States Patent
Jirsa et al.

(10) Patent No.: US 12,518,881 B2
(45) Date of Patent: Jan. 6, 2026

(54) METHOD OF OPTIMIZING AN INTRACRANIAL IMPLANTATION SCHEME OF A SET OF ELECTROENCEPHALOGRAPHIC ELECTRODES

(71) Applicants: UNIVERSITÉ D'AIX-MARSEILLE (AMU), Marseilles (FR); INSTITUT NATIONAL DE LA SANTÉ ET DE LA RECHERCHE MÉDICALE, Paris (FR)

(72) Inventors: Viktor Jirsa, Aubagne (FR); Kenza El Houssaini, Marseilles (FR); Huifang Wang, Aubagne (FR)

(73) Assignees: UNIVERSITÉ D'AIX-MARSEILLE (AMU), Marseilles (FR); INSTITUT NATIONAL DE LA SANTÉ ET DE LA RECHERCHE MÉDICALE, Paris (FR)

( * ) Notice: Subject to any disclaimer, the term of this patent is extended or adjusted under 35 U.S.C. 154(b) by 800 days.

(21) Appl. No.: 17/788,436

(22) PCT Filed: Jan. 22, 2021

(86) PCT No.: PCT/EP2021/051413
§ 371 (c)(1),
(2) Date: Jun. 23, 2022

(87) PCT Pub. No.: WO2021/148582
PCT Pub. Date: Jul. 29, 2021

(65) Prior Publication Data
US 2023/0036464 A1 Feb. 2, 2023

(30) Foreign Application Priority Data

Jan. 24, 2020 (EP) .................................. 20153732

(51) Int. Cl.
G16H 50/50 (2018.01)
G16H 20/40 (2018.01)

(52) U.S. Cl.
CPC ............. *G16H 50/50* (2018.01); *G16H 20/40* (2018.01)

(58) Field of Classification Search
None
See application file for complete search history.

(56) References Cited

U.S. PATENT DOCUMENTS 11,191,476 B2    12/2021  Jirsa et al.
2007/0249953 A1*  10/2007  Frei ................... A61N 1/36082
                                                     607/2

(Continued)

FOREIGN PATENT DOCUMENTS

WO  WO-2010120823 A2 *  10/2010  ........... A61N 1/0456
WO     2015173571 A1     11/2015

(Continued)

OTHER PUBLICATIONS

International Search Report and Written Opinion dated Apr. 23, 2021 in corresponding application No. PCT/EP2021/051413; in English (total 14 pages).

(Continued)

*Primary Examiner* — Huy Q Phan
*Assistant Examiner* — Carl F.R. Tchatchouang
(74) *Attorney, Agent, or Firm* — Seckel IP, PLLC

(57) ABSTRACT

The method of optimizing an intracranial implantation scheme of a set of electroencephalographic electrodes for identification of an epileptogenic zone in an epileptic patient's brain includes: —providing a model of the epileptogenic zone and a model of the propagation of an epileptic discharge from the epileptic zone to a propagation zone, and loading the models in a computerized platform personalized (Continued)

according to the patient's brain; —providing at least one hypothesis of the localization of the epileptogenic zone in the patient brain; —for the at least hypothesis of the localization of the epileptogenic zone, simulating, in the personalized computerized patient's brain, epileptic seizures, and determining, for the hypothesis and epileptic seizures, a network of propagation zones; —for a plurality of intracranial implantation schemes of the electroencephalographic electrodes, obtaining, using the personalized computerized patient's brain, simulated electroencephalographic signals activity to be measured by the intracranial electrodes implanted according to the plurality of schemes; and —determining, from the plurality of schemes, an optimized intracranial implantation scheme of the set of electroencephalographic electrodes.

19 Claims, 13 Drawing Sheets

(56) References Cited

U.S. PATENT DOCUMENTS

| | | | |
|---|---|---|---|
| 2011/0307079 A1* | 12/2011 | Oweiss | A61B 5/4094 |
| | | | 600/545 |
| 2014/0094710 A1* | 4/2014 | Sarma | A61B 5/369 |
| | | | 600/544 |
| 2017/0065349 A1 | 3/2017 | Ourselin et al. | |
| 2019/0254585 A1 | 8/2019 | Jirsa et al. | |
| 2022/0039736 A1 | 2/2022 | Jirsa et al. | |
| 2022/0125368 A1 | 4/2022 | Avisar et al. | |

FOREIGN PATENT DOCUMENTS

| | | |
|---|---|---|
| WO | 2018015778 A1 | 1/2018 |
| WO | 2020167997 A1 | 8/2020 |

OTHER PUBLICATIONS

Sip et al., "Data-driven method to infer the seizure propagation patterns in an epileptic brain from intracranial electroencephalography", medRxiv preprint, https://www.medrxiv.org/content/10.1101/2020.07.30.20165183v1.full.pdf, Aug. 1, 2020, pp. 1-46 (note: in English; D1 cited in the ISR).

Jirsa et al., "The Virtual Epileptic Patient: Individualized whole-brain models of epilepsy spread", Neuroimage, vol. 145, Jan. 15, 2017, pp. 377-388 (note: in English; D3 cited in the ISR).

Proix et al., "Individual brain structure and modelling predict seizure propagation", Brain, vol. 140, No. 3, Feb. 14, 2017, pp. 641-654 (note: in English; D4 cited in the ISR).

An et al., "Optimization of surgical intervention outside the epileptogenic zone in the Virtual Epileptic Patient (VEP)", PLOS Computational Biology, vol. 15, No. 6, Jun. 26, 2019, e1007051, pp. 1-25 (note: in English; D7 cited in the ISR).

El Houssaini et al., "The Epileptor Model: A Systematic Mathematical Analysis Linked to the Dynamics of Seizures, Refractory Status Epilepticus, and Depolarization Block", eNeuro, vol. 7, No. 2, Jan. 31, 2020, pp. 1-54 (note: in English; D8 cited in the ISR).

Jirsa et al., "On the nature of seizure dynamics", Brain, vol. 127, Jun. 11, 2014, pp. 2210-2230 (note: in English; D9 cited in the ISR).

\* cited by examiner

METHOD OF OPTIMIZING AN INTRACRANIAL IMPLANTATION SCHEME OF A SET OF ELECTROENCEPHALOGRAPHIC ELECTRODES

FIELD OF THE INVENTION

The invention relates to a method of optimizing an intracranial implantation scheme of a set of electroencephalographic electrodes for identification of an epileptogenic zone (EZ) in an epileptic patient's brain.

BACKGROUND OF THE INVENTION

The identification of epileptogenic zones in epileptic patients brains has been continuously debated in the epilepsy scientific literature. Non-invasive analyses generally provide first knowledge of the initiation and propagation of seizures across a patient's brain. Nevertheless, invasive implantation of electroencephalographic electrodes is a clinical tool that is needed to improve this first knowledge and allows a better localization of the EZs that are investigated for a potential surgical resection.

The determination of an accurate implantation scheme of electroencephalographic electrodes in a patient's brain is not obvious. The requirements for a successful implantation scheme should allow to measure seizure activity in the suspected seizure onset zones, as well as the seizure propagation zone and potentially functional brain regions, which may be concerned by the surgical decision making.

A poor implantation scheme could have negative impact on surgery. For example, it may provide sparse information on the spatiotemporal organization of brain activity and pose the so-called "missing electrode problem", where clinicians miss relevant information on neural activity in brain areas not sampled by the chosen implantation. At the same time, not every brain area can be sampled, either due to surgical constraints (such as anatomy) and generally due to the surgical risk associated with each electrode implantation leading to the preference to minimize the number of electrodes per implantation.

Accordingly, a need exists for developing methods that allow to propose improved or optimized electrode implantation schemes, that could carry the most information possible about the brain activity, and a better identification of the EZs.

SUMMARY OF THE INVENTION

In accordance with a first aspect, the invention concerns a method of optimizing an intracranial implantation scheme of a set of electroencephalographic electrodes for identification of an epileptogenic zone in an epileptic patient's brain, comprising the following steps:
  providing a model of the epileptogenic zone and a model of the propagation of an epileptic discharge from said epileptic zone to a propagation zone, and loading said models in a computerized platform modelling various zones or nodes of a primate brain and connectivity between said zones or nodes, said computerized platform being personalized according to the patient's brain;
  providing at least one hypothesis of the localization of the epileptogenic zone in the patient brain;
  for said at least one hypothesis of the localization of the epileptogenic zone, simulating, in the personalized computerized patient's brain, epileptic seizures, and determining, for said hypothesis and epileptic seizures, a network of propagation zones;
  for a plurality of intracranial implantation schemes of the electroencephalographic electrodes, obtaining, using the personalized computerized patient's brain, simulated electroencephalographic signals activity that is to be measured by the intracranial electrodes implanted according to said plurality of schemes; and
  determining, from said plurality of intracranial implantation schemes, an optimized intracranial implantation scheme of the set of electroencephalographic electrodes.

Preferentially, —the method of the invention further comprises the step of acquiring structural data the of patient's brain and wherein the personalization of the computerized platform according to the patient's brain is carried out using said structural data; —the model of the epileptic discharge from the epileptogenic zone to the propagation zone is defined by a set of equations that depends on a parameter x0, said parameter being proportional to the excitability of a node within the model, and the epileptogenic zone is parametrized using such parameter; —the hypothesis of the localization of the epileptogenic zone is a clinical hypothesis; —a plurality of hypotheses of the localization of the epileptogenic zone in the patient brain is provided; —the intracranial implantation scheme of the electroencephalographic electrodes is a virtual scheme defining the number of implanted electrodes and their placement; —the step of determining, from the plurality of intracranial implantation schemes, the optimized intracranial implantation scheme of the set of electroencephalographic electrodes activity, is carried out using a metric measuring the difference between the simulated electroencephalographic signals for the plurality of intracranial implantation schemes; —the metric is power density spectrum; —the electrodes of an implantation scheme are virtually placed one by one in the computerized platform and simulations and optimization are carried out after each electrode placement; —all the electrodes of an implantation scheme are virtually placed in the computerized platform before simulation and optimization; —to obtain the simulated electroencephalographic signals, a source level analysis of seizure propagation is carried out; simulated electroencephalographic signals are performed for each hypothesis after electrodes implantation using the following linear system $$Y = G * S$$

wherein G is the gain matrix that relates the sources activity S with the observed sensors activity Y, and depends on electrodes positions; —a signal vector is calculated for each electrode of a scheme that takes into account the number of sensors of said electrode; —the method further comprises the step of differentiating (in a given implantation scheme) the necessary electrodes from the unnecessary electrodes and optimizing the implantation scheme by removing, from said scheme, the unnecessary electrodes; and —the optimization of the implantation scheme allows a better identification of the epileptogenic zone and, preferentially, minimize the number of intracranial electrodes; and —the steps of simulating, in the personalized computerized patient's brain, epileptic seizures, and determining, for said hypothesis and epileptic seizures, a network of propagation zones, obtaining, using the personalized computerized patient's brain, simulated electroencephalographic signals activity that i is to be measured by the intracranial electrodes implanted according to said plurality of schemes, and determining, from said plurality of intracranial implantation schemes, an optimized intracranial implantation scheme of the set of electroencephalographic electrodes, are computer-implemented.

In accordance with a second aspect, the invention concerns A computerized system for optimizing an intracranial implantation scheme of a set of electroencephalographic electrodes for identification of an epileptogenic zone in an epileptic patient's brain, comprising:

a model of an epileptogenic zone and a model of the propagation of an epileptic discharge from said epileptic zone to a propagation zone, the models being loaded in a computerized platform modelling various zones or nodes of a primate brain and connectivity between said zones or nodes, the models describing the onset, the time-course and the offset of epileptic discharges, and personalizing said computer platform using structural data of said patient's brain;

at least one hypothesis of the localization of the epileptogenic zone in the patient brain;

for said at least hypothesis of the localization of the epileptogenic zone, a simulator for simulating, in the personalized computerized patient's brain, epileptic seizures, and for determining, for said hypothesis and epileptic seizures, a network of propagation zones;

a plurality of intracranial implantation schemes of the electroencephalographic electrodes, wherein it is defined virtually the number of implanted electrodes and their placement, and wherein it is obtained, using the personalized computerized patient's brain, simulated electroencephalographic signals activity that is to be measured by the intracranial electrodes implanted according to said plurality of schemes; and wherein, from said plurality of intracranial implantation schemes, it is determined an optimized intracranial implantation scheme of the set of electroencephalographic electrodes using a metric measuring a difference between the simulated electroencephalographic signals activity for the plurality of intracranial implantation schemes.

BRIEF DESCRIPTION OF THE DRAWINGS

Other features and aspects of the present invention will be apparent from the following description and the accompanying drawings, in which:

FIG. 1B illustrates the virtual electrodes implantation using the Virtual Brain;

In FIG. 4A, the H' signals are illustrated in light-grey and dark-grey colours for hypotheses 1 and 2 respectively. FIG. 4B illustrates the power spectrum density. FIG. 4C are brain illustrations for hypotheses 1 (left panel) and 2 (right panel) with the implanted electrode H';

In FIG. 5A, the OF' signals are illustrated in light-grey and dark-grey colours for hypotheses 1 and 2 respectively. FIG. 5B illustrates the power spectrum density. FIG. 5C are brain illustrations for hypotheses 1 (left panel) and 2 (right panel) with the implanted electrode OF';

In FIG. 6A the OR and OR' signals are illustrated with light-grey and dark-grey colours for hypotheses 1 and 2 respectively. FIG. 6B illustrates the power spectrum density. FIG. 6C are brain illustrations for hypotheses 1 (left panel) and 2 (right panel) with the implanted electrodes OR and OR';

In FIG. 7A, the TB' signals are shown with light-grey and dark-grey colours for hypotheses 1 and 2 respectively. FIG. 7B illustrates the power spectrum density. FIG. 7C are brain illustrations for hypotheses 1 (left panel) and 2 (right panel) with the implanted electrode TB';

FIG. 8A illustrates the A' signals with light-grey and dark-grey colours for hypotheses 1 and 2 respectively. FIG. 8B illustrates the power spectrum density. FIG. 8C are brain illustrations for hypotheses 1 (left panel) and 2 (right panel) with the implanted electrode A'; FIG. 9A illustrates the necessary and recommended electrodes. As shown in FIG. 9A, there are 2 necessary electrodes. H" is positioned close to the EZ of both hypotheses. OF' is positioned to the indexed region (37) to which seizures spread for hypothesis 2 (bottom panel) and does not for hypothesis 1 (top panel). OR and OR' are considered as recommended electrodes which are positioned in brain zone (PZ) recruited by seizures for the both hypotheses. FIG. 9B illustrates the unnecessary electrodes. The site of these electrodes is out of the EZ and PZ.

DETAILED DESCRIPTION OF THE INVENTION

Figure 1A:
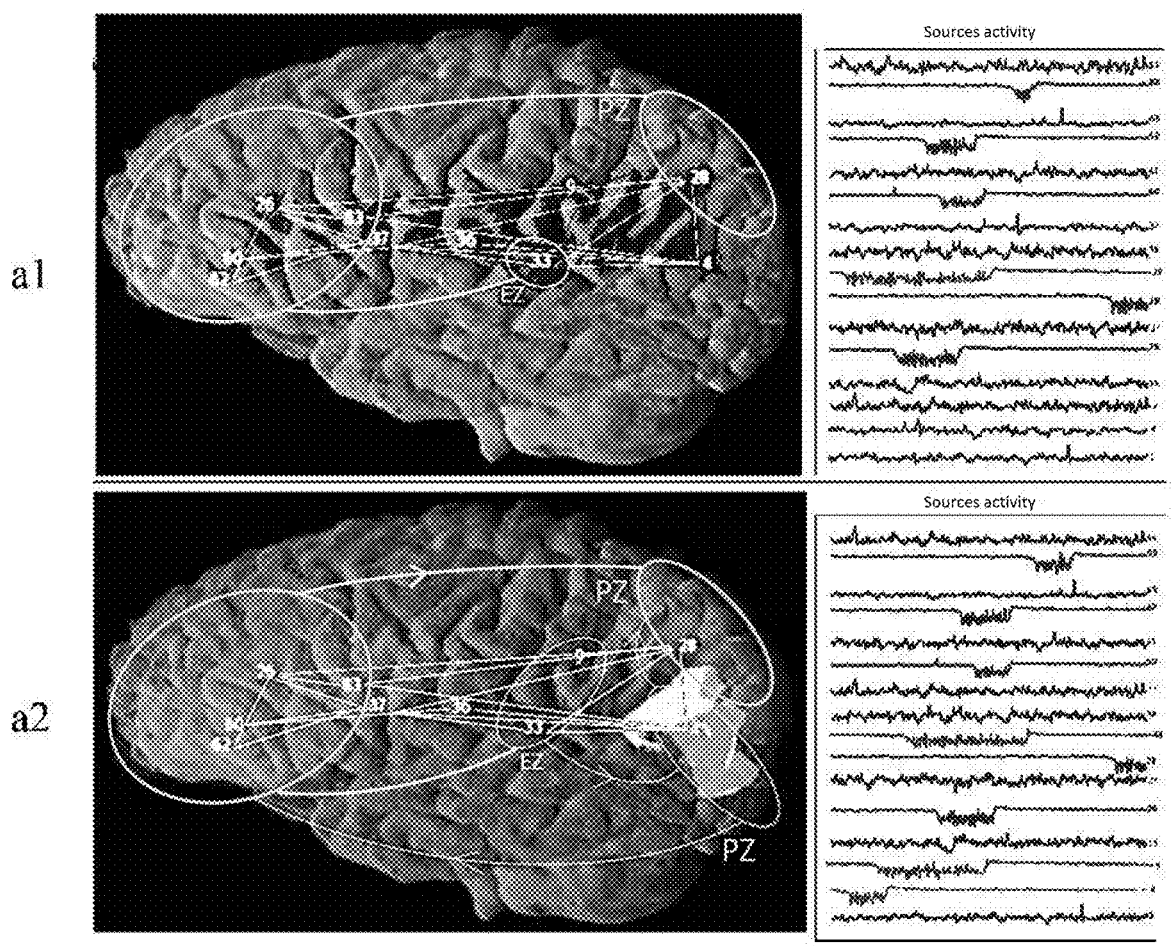
FIGS. 1A and 1B illustrate brain epileptic networks using the Virtual Brain. The a1 and a2 rows show an example of epileptic seizures spread between brain regions for two different hypotheses 1 and 2 respectively. With two different (EZ) for both hypotheses, sets of Epileptogenic Zones seizures could spread to same regions (PZ as Propagation Zones), drawn with light-grey circles. However, seizures could spread to other regions (PZ) for only one hypothesis, for instance, here a2, drawn with lighter-grey circles. Top and bottom right sides of the plot of FIG. 1A describe the time-activity of brain regions for hypothesis 1 and 2 respectively.
Figure 1B:
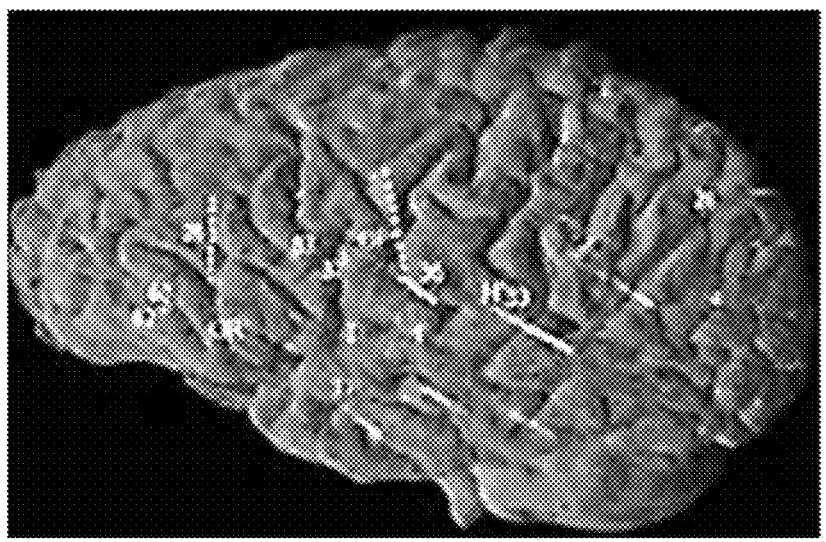

This invention relates to a method of optimizing an intracranial implantation scheme of a set of electroencephalographic electrodes for identification of an epileptogenic zone (EZ) in an epileptic patient's brain.

Optimizing the intracranial implantation scheme of a set of electroencephalographic electrodes for identification of an epileptogenic zone (EZ) does mean that the placement or positioning of the electrodes of the set of electrodes that are implanted in the patient's brain is made as effective as possible to improve the identification of the EZ. For a number of electrodes in the set, the best electrode placement is suggested, with minimal invasiveness. If some electrodes of the set of electrodes appear to be useless for identification of the EZ, then those electrodes are identified as such and may be eliminated from the implantation scheme.

The various steps of the method according to the invention are computer-implemented. In particular, the steps of simulating, in the personalized computerized patient's brain, epileptic seizures, and determining, for said hypothesis and epileptic seizures, a network of propagation zones, obtaining, using the personalized computerized patient's brain, simulated electroencephalographic signals activity that is to be measured by the intracranial electrodes implanted according to said plurality of schemes, and determining, from said plurality of intracranial implantation schemes, an optimized intracranial implantation scheme of the set of electroencephalographic electrodes, are computer-implemented Implanted electroencephalographic (EEG) electrodes are often necessary to pinpoint the origin of the seizure activity. They are particularly helpful for more precisely localizing seizure activity that has been previously identified, for example, with scalp EEG recordings. In particular, the scalp EEG recordings may help to determine that seizures arise from a particular brain hemisphere. However, implanted EEG electrodes may reveal whether the epileptogenic activity arises specifically from the frontal lobe, rather than the temporal, parietal, or occipital lobes of said hemisphere. These invasive electrodes allow EEG recording directly from the surface of the brain or from deeper cortical structures. Implanted EEG electrodes also can be used to stimulate the brain and map cortical and subcortical neurologic functions, such as motor or language function, in preparation for epilepsy surgery. This information is then used in conjunction with the seizure data to determine the risk-benefit profile of the surgery. In some cases, the stimulation of electrodes may trigger auras or seizures during this functional mapping session. Practically, there are two main categories of implanted electrodes: subdural electrodes and stereotaxic depth electrodes. Subdural electrodes generally include a series of discs mounted in thin plastic and designed to lie on the surface of the cortex. These discs are often configured as linear strips consisting of a selected number of electrode contact points. These strips are inserted into the intracranial cavity through small burr hole openings and are placed under the temporal or frontal lobes or along the medial surfaces of the hemispheres. Stereotaxic depth electrodes are fine, flexible plastic electrodes attached to wires that carry currents from deep and superficial brain structures. These currents are recorded through contact points mounted in the walls of the electrodes. Fine wires extending through the bores of the plastic electrodes are inserted with stylets placed in the bores. Stereotaxic depth electrodes are particularly helpful in determining the side of origin in temporal lobe epilepsy or, more commonly, in frontal lobe epilepsy in which the spread of abnormal discharges from one frontal lobe to the other is so rapid that the site or side of origin is difficult to ascertain. Depth electrodes may be placed from the convexity in angled trajectories from the surface of the skull, or they may be placed along the side of the head in trajectories that are all parallel if they are truly horizontal or perpendicular to the side of the skull.

According to a first step of the invention, a model of the EZ and a model of the propagation of an epileptic discharge from said EZ to a propagation zone (PZ) are provided, and these models are loaded in a computerized platform modelling various zones or nodes of a primate brain and connectivity between said zones or nodes, said computerized platform being personalized according to the patient's brain.

The computerized platform is for example a virtual brain. An example of a virtual brain is disclosed in the publication document entitled "*The Virtual Brain: a simulator of primate brain network dynamics*", Paula Sanz Leon et al., 11 Jun. 2013, which is incorporated herein, by citation of reference. In this publication document, the "Virtual Brain" is disclosed as a neuro-informatics platform for full brain network simulations using biologically realistic connectivity. This simulation environment enables the model-based inference of neurophysiological mechanisms across different brain scales that underlie the generation of macroscopic neuroimaging signals including functional Magnetic Resonance EEG and Imaging (fMRI), Magnetoencephalography (MEG). It allows the reproduction and evaluation of personalized configurations of the brain by using individual subject data. The model of the EZ is a mathematical model describing the onset, the time-course and the offset of epileptic discharges in said zone. Such a model is disclosed, for example, in the publication document entitled "*On the nature of seizure dynamics*", Jirsa et al., Brain 2014, 137, 2210-2230, which is incorporated herein, by citation of reference. This model is named "Epileptor". It comprises five state variables acting on three different time scales. On the fastest time scale, state variables $x_1$ and $y_1$ account for the fast discharges during the seizure. On the slowest time scale, the permittivity state variable z accounts for slow processes such as variation in extracellular ion concentrations, energy consumption, and tissue oxygenation. The system exhibits fast oscillations during the ictal state through the variables $x_1$ and $y_1$. Autonomous switching between interictal and ictal states is realized via the permittivity variable z through saddle-node and homoclinic bifurcation mechanisms for the seizure onset and offset, respectively. The switching is accompanied by a direct current (DC) shift, which has been recorded in vitro and in vivo. On the intermediate time scale, state variables $x_2$ and $y_2$ describe the spike-and-wave electrographic patterns observed during the seizure, as well as the interictal and preictal spikes when excited by the fastest system via the coupling $g(x_1)$. The equations of the model read as follows:

$$\dot{x}_1 = y_1 - f_1(x_1, x_2) - z + I_1$$

$$\dot{y}_1 = 1 - 5x_1^2 - y_1$$

$$\dot{z} = \frac{1}{\tau_0}(4(x_1 - x_0) - z)$$

$$\dot{x}_2 = -y_2 + x_2 - x_2^3 + I_2 + 0.002g(x_1) - 0.3(z - 3.5)$$

$$\dot{y}_2 = \frac{1}{\tau_2}(-y_1 + f_2(x_1, x_2))$$

where $$f_1(x_1, x_2) = \begin{cases} x_1^3 - 3x_1^2 & \text{if } x_1 < 0 \\ (x_2 - 0.6(z-4)^2)x_1 & \text{if } x_1 \geq 0 \end{cases}$$

$$f_2(x_1, x_2) = \begin{cases} 0 & \text{if } x_2 < -0.25 \\ 6(x_2 - 0.25)x_1 & \text{if } x_2 \geq -0.25 \end{cases}$$

$$g(x_1) = \int_{t_0}^{t} e^{-\gamma(t-\tau)} x_1(\tau) d\tau$$

and $x_0 = -1.6$; $\tau_0 = 2857$; $\tau_2 = 10$; $I_1 = 3.1$; $I_2 = 0.45$; $\gamma = 0.01$. The parameter $x_0$ controls the tissue excitability, and is epileptogenic triggering seizures autonomously, if $x_0$ is greater than a critical value, $x_{OC} = -2.05$. Otherwise, the tissue is healthy. $I_1$ and $I_2$ are passive currents setting the operating point of the model. The model of the propagation zone is identical to the one of an EZ, however with an excitability parameter inferior to the critical value $x_{OC} = -2.05$. All other brain areas may be modelled by Epileptors with excitability values far from the threshold, or equivalently standard neural population models as disclosed in Paula Sanz Leon et al., 11 Jun. 2013, which is incorporated herein, by citation of reference. The coupling between brain areas follows a mathematical model as disclosed in the publication document entitled "*Permittivity Coupling across Brain Regions Determines Seizure Recruitment in Partial Epilepsy*", Timothée Proix et al., The Journal of Neuroscience, Nov. 5, 2014, 34 (45): 15009-15021, which is incorporated herein, by citation of reference. Permittivity coupling quantifies the influence of neuronal fast discharges $x_{1,j}$ of a remote region j on the local slow permittivity variable of a region i. Changes in ion homeostasis are influenced by both local and remote neuronal discharges via a linear difference coupling function, which quantifies the deviation from the interictal stable state as a perturbation perpendicular to the synchronization manifold. The linearity is justified as a first order approximation of the Taylor expansion around the synchronized solution. Permittivity coupling further includes the connectome $C_{ij}$, a scaling factor G, which both are absorbed in $K_{ij}=GC_{ij}$. The permittivity coupling from area j to area i reads $$\sum_{j=1}^{N} K_{ij} \cdot (x_{1,j}(t-\tau_{ij}) - x_{1,i}(t)),$$

where $\tau_{ij}$ denotes the signal transmission delay. When loading the models of the epileptogenic zone (EZ) and propagation zone (PZ) in the virtual brain, the signal transmission time delays are here neglected, because synchronization effects will not be considered, but rather only the epileptic spread, which is determined by the slow dynamics of the permittivity coupling. Mathematically, the virtual brain then corresponds to the following equations:

$$\dot{x}_{1,i} = y_{1,i} - f_1(x_{1,i}, x_{2,i}) - z_i + I_{1,i}$$
$$\dot{y}_{1,i} = 1 - 5(x_{1,i})^2 - y_{1,i}$$
$$\dot{z}_i = \frac{1}{\tau_0}\left(4(x_1 - x_0) - z_i - \sum_{j=1}^{N} K_{ij} \cdot (x_{1,j} - x_{1,i})\right)$$
$$\dot{x}_{2,i} = -y_{2,i} + x_{2,i} - (x_{2,i})^3 + I_{2,i} + 0.002 \, g \, (x_{1,i}) - 0.3(z_i - 3.5)$$
$$\dot{y}_{2,i} = \frac{1}{\tau_2}(-y_{2,i} + f_2(x_{1,i}, x_{2,i}))$$

The personalisation comprises a structural reconstruction of the patient brain that is carried out in the Virtual Brain, using the structural data acquired for said patient brain. The structural data are for example images data of the patient brain acquired using magnetic resonance imaging (MRI), diffusion-weighted magnetic resonance imaging (DW-MRI), nuclear magnetic resonance imaging (NMRI), or magnetic resonance tomography (MRT).

According to a further step of the invention, at least one hypothesis of the localization of the epileptogenic zone (EZ) in the patient brain is provided.

In fact, the location of one or a plurality of possible epileptogenic zones, one or a plurality of possible propagation zones and of one or a plurality of possible other zones are initially identified in the functional data of the patient brain, and corresponding zones are parametrised as epileptogenic, propagation or other zones in the Virtual Brain. Practically, non-invasive functional neuroimaging informs the clinician expert on the evolution of the epileptic seizure and allows the formulation of hypotheses on the location of the EZ, i.e. the hypothetical area in the brain responsible for the origin and early organisation of the epileptic activity. The PZ comprises areas that are recruited during the seizure evolution, but that are by themselves not epileptogenic. Parameters are initially set in the Virtual Brain network model following the hypothesis on the EZ. A spatial map of epileptogenicity may be defined in the Virtual Brain. In this map, each node is characterized by an excitability value $x_0$, which quantifies the ability of the model of a zone to trigger a seizure. For an isolated zone, G=0, the model can trigger seizures autonomously if $x_0 > x_{0C}$ and is referred to as epileptogenic. Inversely, if $x_0 < x_{0C}$, the model does not trigger seizures autonomously and is not epileptogenic. The spatial map of epileptogenicity comprises the excitability values of the EZ, the PZ and all other zone. Of course, only the nodes in the EZ discharge autonomously while embedded in the virtual brain.

According to a further step of the invention, for each hypothesis of the localization of the epileptogenic zone, simulating of epileptic seizures is carried out in the personalized computerized patient's brain, and determining, for said hypothesis and epileptic seizures, a network of propagation zones.

According to a further step of the invention, for a plurality of intracranial implantation schemes of the electroencephalographic electrodes, it is obtained, using the personalized computerized patient's brain, simulated electroencephalographic signals activity that is to be measured by the intracranial electrodes implanted according to said plurality of schemes.

Amplitude and power of onset seizures measured from the electrodes signals placed into an epileptic brain, depend on electrodes positions. When seizures are with large amplitude and power onset, the epileptogenic zone would be better described, and the associated electrodes could be then considered as the best. The invention allows to optimize the electrodes implantation, by including the power of SEEG signals and the amplitude shape of onset seizures, for a patient with epilepsy.

According to the further step of the invention, it is determined, from the plurality of intracranial implantation schemes for which simulated electroencephalographic signals activity were obtained, an optimized intracranial implantation scheme of the set of electroencephalographic electrodes.

The step of determining, from the plurality of intracranial implantation schemes, an optimized intracranial implantation scheme of the set of electroencephalographic electrodes, is carried out using a metric that is measuring the difference between the simulated electroencephalographic signals for the plurality of intracranial implantation schemes.

A metric that may be implemented is, for example, the power density spectrum (PSD). However, other metrics may be implemented such as, for example, angle or envelope functions of the signals.

Example 1: Methods

Workflow

Figure 2:
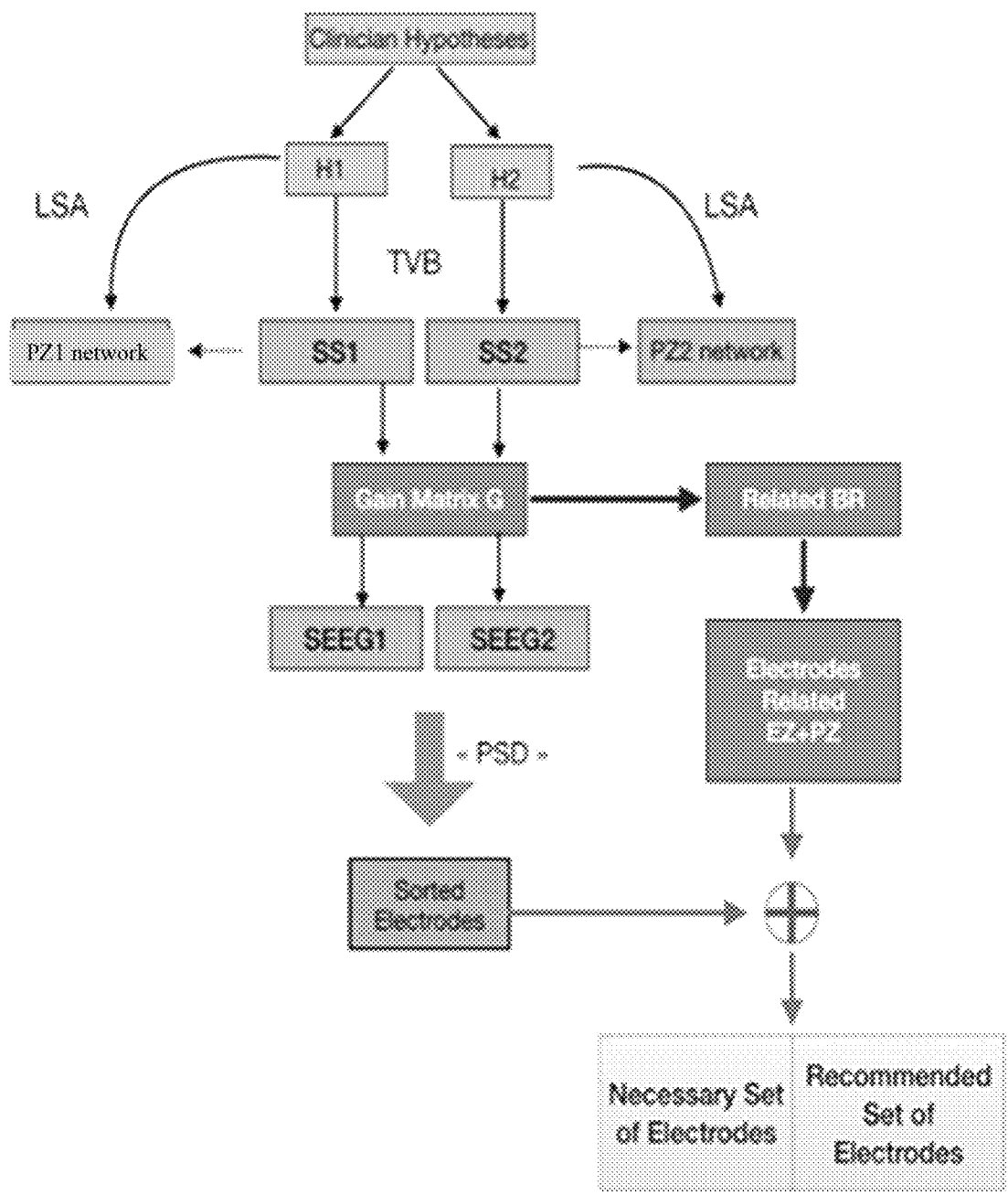
FIG. 2 illustrate the workflow of the method according to the invention.

A workflow was set in which the ordered various procedures needed for optimal electrode implantation is defined. This workflow is provided in FIG. 2. As appearing on this figure, clinician hypotheses of EZs, at least one, for example two, and possibly more than two, are formulated for each epileptic patient. The workflow of FIG. 2 is built on the basis of two clinician hypotheses (SS1 and SS2). For each hypothesis, brain regions activity defined on the cortical surface of patient are generated, and the seizure propagation ($PZ_1$ and $PZ_2$ networks) are estimated, based on virtual brain simulations. To make those simulations, a mathematical model from the Virtual Brain is selected, which is able to closely mimic the seizures dynamics recorded from patients, and a proper set of parameters is defined. Before carrying out the optimization, it is proceeded to a virtual brain implantation of the electrodes. In this context, various approaches may be useful to implant the electrodes. Finally, optimization comes in. A tool is defined to use power spectrum density (PSD) as a metric to measure the difference between SEEG signals of clinician hypotheses, and it is demonstrated how from PSD, electrodes placement, and seizure propagation organization, it could be predicted the signals pattern of any electrode placed into the brain, related to each hypothesis considered. More interestingly, the best electrodes placement suggested, with minimal is invasiveness. A particular step of the workflow is seizure propagation organization, which allows later electrodes optimization. It is suggested a way to organize the seizure propagation ($PZ_1$ and $PZ_2$ networks) of both hypotheses.

Patient Data

In this example, the data of an epileptic patient, identified as RB in the prior publication of Proix et al. (see in publication documents references), who is a right-handed 35 year old male initially diagnosed with left temporal epilepsy, were considered. It was aimed to determine the electrodes with best positions from those placed into brain's patient. The brain connections of the patient and epilepsy diagnosis were used as data. The number and locations of implanted electrodes were determined after localizing EZ hypotheses. 10 electrodes were placed on left hemisphere and two others in right hemisphere where each of one comprises 10 or 15 contacts.

The clinician hypotheses of the EZs could be various, and the electrode providing a good distinction between hypotheses signals would be considered helpful. To develop the optimization method of the invention, two EZ hypotheses were considered. The EZ set of hypothesis 1 is composed of one brain region corresponding to left transverse temporal pole. The EZ set of hypothesis 2 consists of two brain regions: left transverse temporal pole and left thalamus, which are close to each other.

Numerical Simulations

The source-level analysis of seizure propagation through the brain is an important point that was implemented in an attempt to determine the so-called Propagation Zone, i.e. the set of regions that are recruited during the seizures activity. For each one of the two EZ hypotheses, computational simulations were performed using the Virtual Brain. The source-level signals with seizures were determined, where the corresponding brain regions are grouped in $PZ_1$ network for hypothesis 1 and in $PZ_2$ network for hypothesis 2.

The model that was used to make simulations is the Epileptor™ model defined above, which most mimics seizure dynamics. The model comprises two 2D populations and a slow state variable that drives the model dynamics providing then an autonomous alternation between ictal and resting states. The model parameters that was set for both hypotheses are the same in the network, excepting the epileptogenicity parameter $x_0$ which has been varied on the basis of clinical hypotheses formulated regardless the epileptogenic zone EZ. The $x_0$ values were selected from previous works on epilepsy spread and virtual epileptic patient (Jirsa et al., Neuroimage 2016, Proix et al., Brain 2017).

The parameters values, that were used are as follows:
Subsystem 1: a=1; b=3; c=1; d=5; $I_{ext_1}$=3.1; m=0
Subsystem 2: $a_2$=6; $\tau_2$=10; $I_{ext_2}$=0.45; $\gamma$=0.01
Slow z Dynamics:

$$r = 0.0002, s = 4$$

$$x_0 = \begin{cases} -1.6 & \text{for epileptogenic nodes} \\ -2.25 & \text{for non epileptogenic nodes} \end{cases}$$

The coupling between the Epileptors $K_{ij}$ in the network corresponds to the normalized brain connectivity given by $K_{ij}=K_s C_{ij}$, where $C_{ij}$ is the connectivity matrix and $K_s$ a scale factor. Here, $K_s$=-2.

Network Propagation

When the hypothesis on EZ changes, seizures could spread differently in the brain network even if it is characterized by the same features (coupling, model equations and parameters).

With time series visualization, the brain regions recruited by seizures were determined for each of the hypotheses 1 and 2. They form two networks sets $PZ_1$ and $PZ_2$ respectively.

Electrode Implantation

Scalp EEGs do not allow to identify accurately the epileptogenic zones. For this reason, clinicians need to perform intracranial into the brain and investigate through SEEG recordings for possible hypotheses of EZs.

There is an established convention for intracranial implantation, proposed by Talairach and Bancaud, with standard placements of electrodes over brain regions. Even with the benefit of this kind of implantation, it must be balanced with risks. For the preimplantation phase, limited electrodes number to be placed is an important complicating factor. Since clinician based on EEG recordings and other analysis to identify the EZ, the number of implant electrodes should be kept to a minimum, covering all possible hypotheses were formulated by clinicians.

With the Virtual Brain and Virtual Epileptic Patient (VEP), the patient's brain network was reconstructed and the electrodes were placed with three-dimensional positions into the brain, as proposed by clinicians. More, a 2D projection of electrodes and brain network was carried out to obtain a great overview of the distribution of electrodes in space. Brain network is reconstructed with same electrodes configuration for both hypothesis.

Strategies for Electrode Implantation

The strategies for electrode implantation are various. The inventors have considered two strategies hereunder which may be used to improve the electrodes optimization. It is noted that the metrics used for optimization are the same for the two strategies. The choice is based on the computational cost which should be the lowest possible. Indeed, the lower are the strategy computational costs, the better it is.

The first strategy consists of recording the electrode activity each time a single electrode was placed. And based on the optimization metrics, the informative value is decided for each case. Computationally, that means making E simulations where it is measured each time the activity of the implanted electrodes until the last electrode is reached where E is the number of electrodes candidates for implantation. Moreover, each time an electrode is added, all the metrics for optimization are used to make a decision on the implanted electrode.

It is proposed to use another strategy with lower computational cost that consists of positioning all the selected electrodes for implantation in the brain, and to introduce then the optimization metrics in order to determine the best electrodes positions. Here, a single simulation is carried out to obtain the SEEG signals and with a single use of all the optimization metrics, the best electrodes positions is determined.

Except of the computational cost, the activity of all the electrodes placed either with the first or the second strategy remains the same.

Building SEEG Signals

Simulated SEEG signals were performed for both hypotheses after electrodes implantation using the following simple linear system (forward problem).

$$Y = G*S$$

wherein G is the gain matrix that relates the sources activity S with the observed sensors activity Y, and depends on electrodes positions.

The gain matrix G can be written as:

$$G = \frac{1}{4\pi |r_{sens} - r_{sc}|^2}$$

where $r_{sens}$ and $r_{sc}$ are 3D positions vectors of the electrode and brain region, respectively. This was achieve without constrained orientations of the sources (orientation: the normal to the cortex at the corresponding vertex).

The signal vector S $(t) = [s_1(t), \ldots, s_N(t)]T$, which illustrates where seizures spread in the brain network of N regions is obtained with the Virtual Brain numerical simulations.

Method to Improve Electrode Optimization

The signal vector $Y(t) = [Y_1(t), \ldots, Y_K(t)]T$, where K is the total number of sensors describes the activity of the E placed electrodes that do not have necessarily the same sensors number $C_E$. Y (t) could be divided into E sub-vectors $x_i(t) = [Y_1(t), \ldots, Y_{Ci}(t)]T$, where $C_i$ is the number sensors of an electrode i. $x_i(t)$ may be written as:

$$x_i(t) = A*S(t), i = 1, \ldots, E$$

where $A(C_1 \times N)$ is the gain matrix, connecting the $C_i$ sensors of the electrode I to the N brain regions.

Consequently, the gain matrix $G(K \times N)$ may be interpreted as a block matrix, where each of the blocks corresponds to a submatrix $A(C_i \times N)$, connecting the $C_i$ sensors of electrode i to the N brain regions.

As mentioned above, the activity of all the electrodes placed Y(t) remains the same for all strategies used for the implantation.

As a proof of implantation 1: if one electrode with $C_1$ sensors is placed, the activity can be obtained with $Y^{(1)} = G^{(1)} \cdot S$ where $G^{(1)} = G^{11}$ gain matrix relating the sources activity S with the placed electrode activity $Y^{(1)}$, and depends on the electrode position. Then, $Y^{(1)} = G^{11} \cdot S$, the size of $G^{11}$ is $(C_1 \times N)$ where $C_1$ represent the sensors number of the placed electrode and N the brain regions (sources) number. $Y^{(1)}(t)$ is a vector of dimension $(C_1 \times 1)$.

As a proof of implantation 2: if a second electrode is placed, the two electrodes time signals can be written as $Y^{(2)} = G^{(2)} \cdot S$ where:

$$G^{(2)} = \begin{bmatrix} G^{11} \\ G^{21} \end{bmatrix}$$

is the gain matrix relating the sources activity S with the two placed electrodes activity $Y^{(2)}$. Then, $$Y^{(2)} = \begin{bmatrix} G^{11} \cdot S \\ G^{21} \cdot S \end{bmatrix} = \begin{bmatrix} Y^{(1)} \\ G^{21} \cdot S \end{bmatrix}$$

where $G^{11}$ is obtained from the first electrode positions with $C_1$ sensors, and $G^{21}$ from the second electrode positions with $C_2$ sensors. $G^{(2)}$ may be interpreted as a block matrix with size of $((C_1+C_2) \times N)$. $Y^{(2)}(t)$ is a vector of dimension $((C_1+C_2) \times 1)$, which can be considered as the partition of two sub-vectors where the first one corresponds to the vector $Y^{(1)}(t)$.

As a proof of implantation E: if a $E^{ieth}$ electrode is placed, the E electrodes time signals can be written as $Y^{(E)} = G^{(E)} \cdot S$ where $$G^{(E)} = \begin{bmatrix} G^{11} \\ G^{21} \\ \ldots \\ G^{E1} \end{bmatrix},$$

$$Y^{(E)} = G^{(E)} \cdot S = \begin{bmatrix} G^{11} \cdot S \\ G^{21} \cdot S \\ \ldots \\ G^{E1} \cdot S \end{bmatrix} \text{ and}$$

$$Y^{(E)} = \begin{bmatrix} Y^{(1)} \\ Y^{(2)} \\ \ldots \\ Y^{(E-1)} \\ G^{E1} \cdot S \end{bmatrix}$$

Metric Optimization: Power Spectrum Density

The Simulated SEEG signals from E electrodes are with power and shape that change depending on electrodes positions. For an epileptic brain, the sensors signals showing seizures are related to the presence of epileptogenic zone. To determine the best electrode positions, the obtained SEEG time series were analyzed for the hypotheses 1 and 2 using the power spectrum density PSD which describes how the power of a time signal is distributed with frequency. For all hypotheses k, and over a same time interval, the maximal frequency of sensors signals was obtained, which corresponds to the maximal value of PSD. The PSD values are then separately assembled for each electrode i to form vectors $v_i^k$. The size of the vector $v_i^k$ depends on the sensors number of the corresponding electrode i.

To distinguish between the two hypotheses 1 and 2, the absolute difference between vectors $v_i^{(1)}$ and $v_i^{(2)}$ was determined consisting of maximal PSD values for hypotheses 1 and 2 respectively, which would be written as $DIF_i = |v_i^{(1)} - v_i^{(2)}|$ for all electrodes i. It was then determined the Nv(i) value which is the norm of the vector $DIF_i$. For the patient, there are (12) $N_v(i)$ values, each of all is related to an electrode i. Now, in order to determine which electrode of those placed is the best one, they were sorted in decreasing order the $N_v(i)$ values, and associated to the sort the corresponding electrodes. It was assumed that it could better distinguished between the two hypotheses with electrodes providing larger difference between vectors $v_i^{(1)}$ and $v_i^{(2)}$.

Metric Optimization: Seizure Propagation

The matrix G of size $K \times N$, relates the N sources activity with the observed K sensors activity, and depends on electrodes positions. For each row of G which informs how far is the distance between a sensor K and regions N, the N elements were sorted in decreasing order, and only the first five sorted elements were considered. The sorted elements were associated to the corresponding index of regions which form a new matrix of size K×5.

Each block of G(K×N) corresponds to a submatrix A(C× N), connecting the C sensors of an electrode i to N brain regions. A matrix Ri was consequently defined, which includes the corresponding index of regions associated to the electrode i, where C×5 is the size of $R_i$ and C is the sensors number of the electrode i. This approach may not been helpful if the focus is exclusively on determining the closest regions for all sensors. The main strength of the current approach is the exploitation of the network character of the Virtual Brain, which enables to use the network propagation as a data feature for optimization of electrode implantation and is based on the regions indexed by the elements of the $R_i$ matrices.

It was examined whether the indices of $R_i$ rows could be related to the EZ of the two hypotheses or to the sets $Q_{com}$, $Q_{Hyp1}$, and $Q_{Hyp2}$ that were obtained after organizing the propagation networks $PZ_1$ and $PZ_2$.

Example 2: Results

Workflow Implementation

It was considered two cases as examples of clinicians' hypothesis each comprising various sets of brain regions. The first hypothesis comprises an epileptogenic zone EZ consisting of one brain region (left temporal lobe, SS1). The EZ for second hypothesis comprises two brain regions (left temporal lobe and left thalamus, SS2).

Seizure Propagation Through Numerical Simulations

Figure 3:
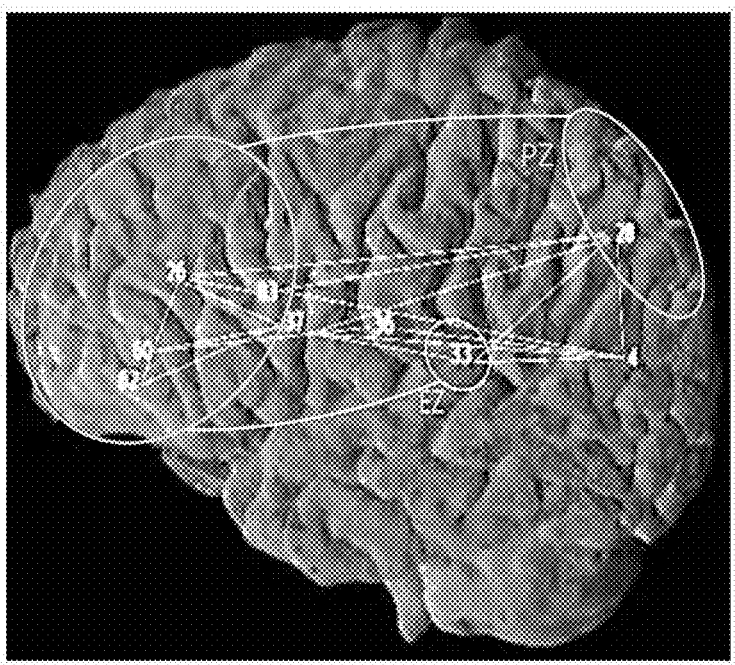
FIG. 3 illustrates an example of seizure propagation of an epileptic patient according to the invention.
Figure 3:
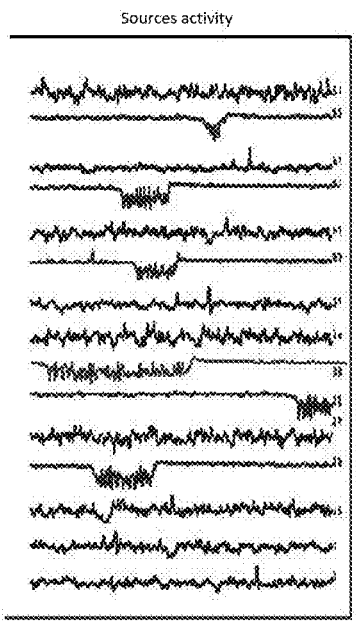
Figure 3:
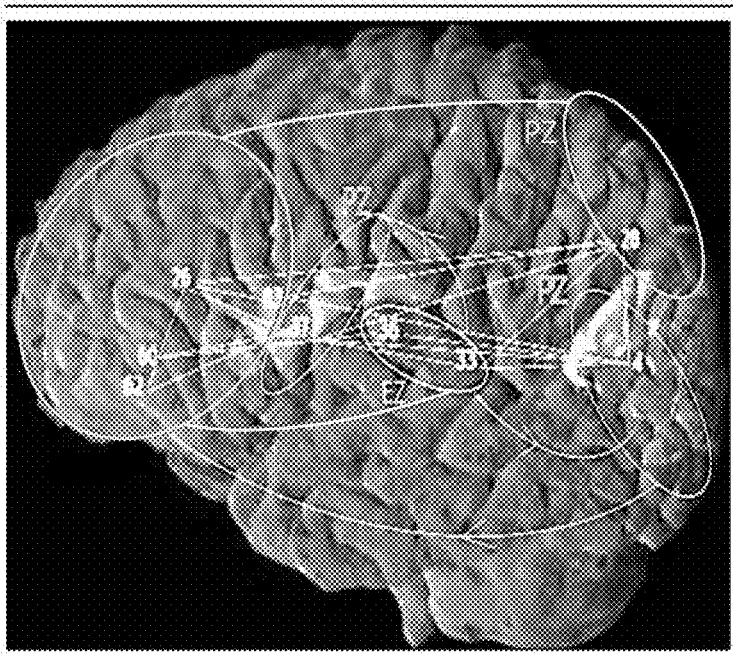
Figure 3:
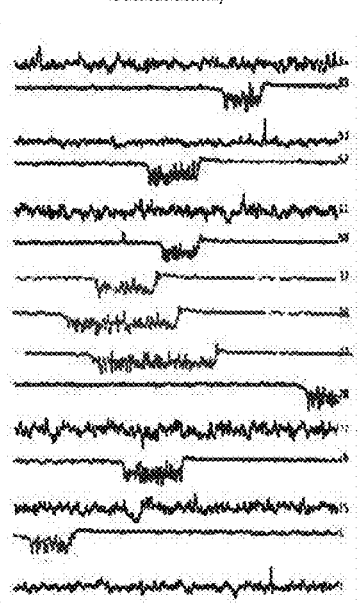

With the Virtual Brain, it was obtained the networks activity of the brain sources for hypotheses 1 and 2 as shown in FIG. 3. Dark-grey and light-grey signals are for the regions related respectively to the epileptogenic zone EZ and propagation zone PZ. Black signals are for the non-involved regions. Seizures spread differently in the two networks when changing the EZ. The network $PZ_1$ of hypothesis 1 contains the regions indexed by (26, 28, 60, 62, and 83). The network $PZ_2$ of hypothesis 2 contains the regions (4, 26, 28, 37, 60, 62, and 83). The spatial evolution of seizure propagation may be visualized in FIG. 3 for hypothesis 1 and hypothesis 2.

Organizing the Networks of Seizure Propagation

Based on the networks $PZ_1$ and $PZ_2$, the set $Q_{com}$ that includes the common regions of the both $PZ_1$ and $PZ_2$ is: 26, 28, 60, 62, and 83. The set QHyp2 comprises the regions indexed by (4 and 37) that are recruited during the evolution of epileptic activity for hypothesis 2, for hypothesis 1 do not. Finally, there are no regions to which seizures spread for hypothesis 1 and for hypothesis 2 do not. Consequently, the set QHyp1 remains empty. Note that it is not relevant here to determine which brain regions discharge first, but rather determine the regions that are recruited by the seizure propagation. The relevant data feature is thus a real network property, and not simply a temporal feature.

Metric Optimization: Power Spectrum Density (PSD)

The power of the simulated SEEG signals was measured, for the two hypotheses, using PSD. The signals power of each electrode were drawn separately, more specially $PSD_M$, Which is the maximal PSD value of each contact signal. The plots of the first six electrodes resulting from the sort are shown in FIGS. 4C, 5C, and 6C, wherein the $PSD_M$ values are labelled as circles. The vectors $v_i^1$ for hypothesis 1, and $v_i^2$ for hypothesis 2 are represented by the dark-grey and light-grey curves respectively, where each of the vectors consists of C values of the $PSD_M$, with C is the sensors number of an electrode i. The sort of $N_v(i)$, which is the norm of:

$$DIF_i = |v_i^{(1)} - v_i^{(2)}|$$

could be divided on two sets $E_1$ and $E_2$ where $E_1$ includes the first five electrodes with the best positions that are H', OF', A', OR and OR'. $E_2$ consists of the rest of the electrodes ordered as (TB', GC', I', TP', B', TB, GPH'). It is to be noted that the electrodes of the set 1, and TB' from the set 2 are indeed the first six electrodes as mentioned above.

Figure 4A:
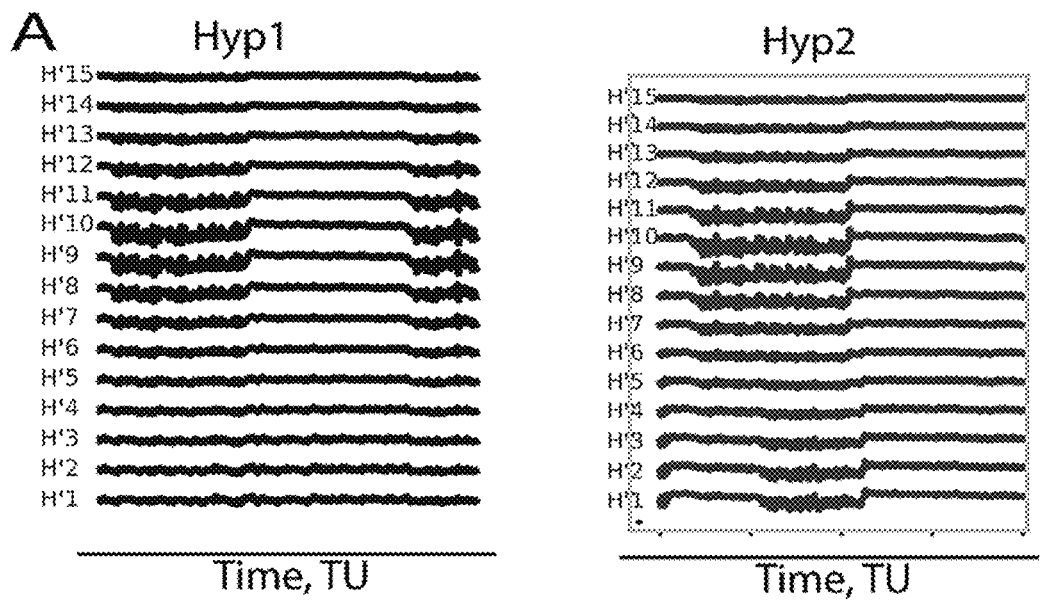
FIGS. 4A, 4B and 4C illustrate the localization and the signals of the electrode H' according to the invention.
Figure 4B:
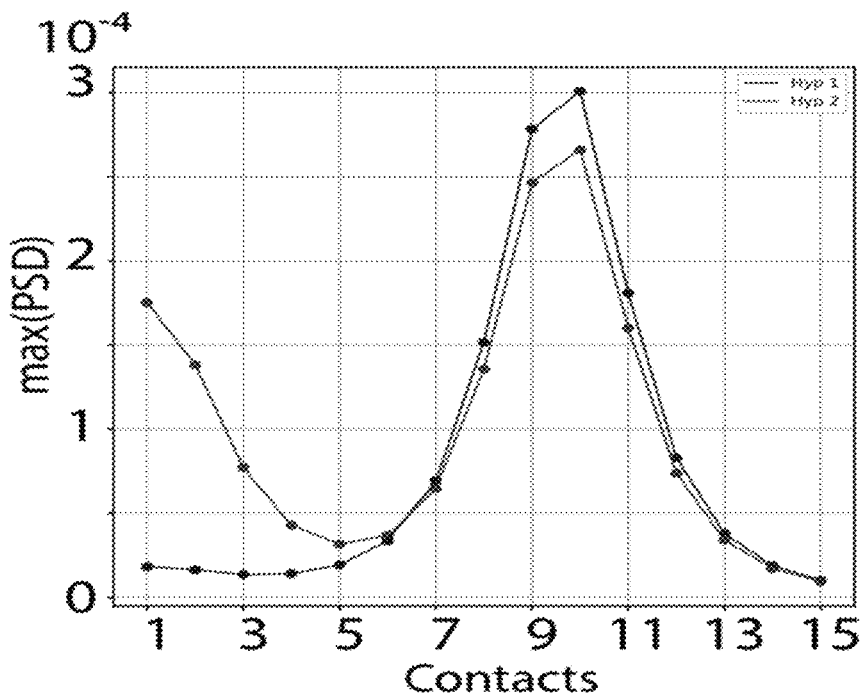
Figure 4C:
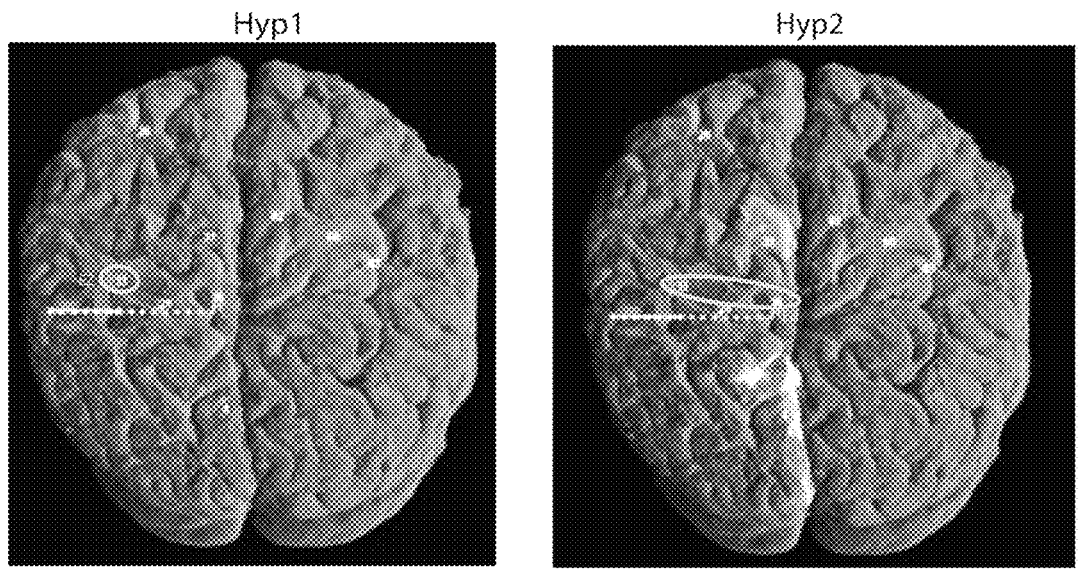

Except for the electrode A', all electrodes of the set 1 show seizures, as show in FIGS. 4 and 5. Moreover, the electrode signals as shown in FIGS. 4A, 4B and 6A, 6B and the corresponding $PSD_M$ values as shown in FIGS. 4C and 6C demonstrate that the signal power increases as the contact signal shows seizures.

Figure 6A:
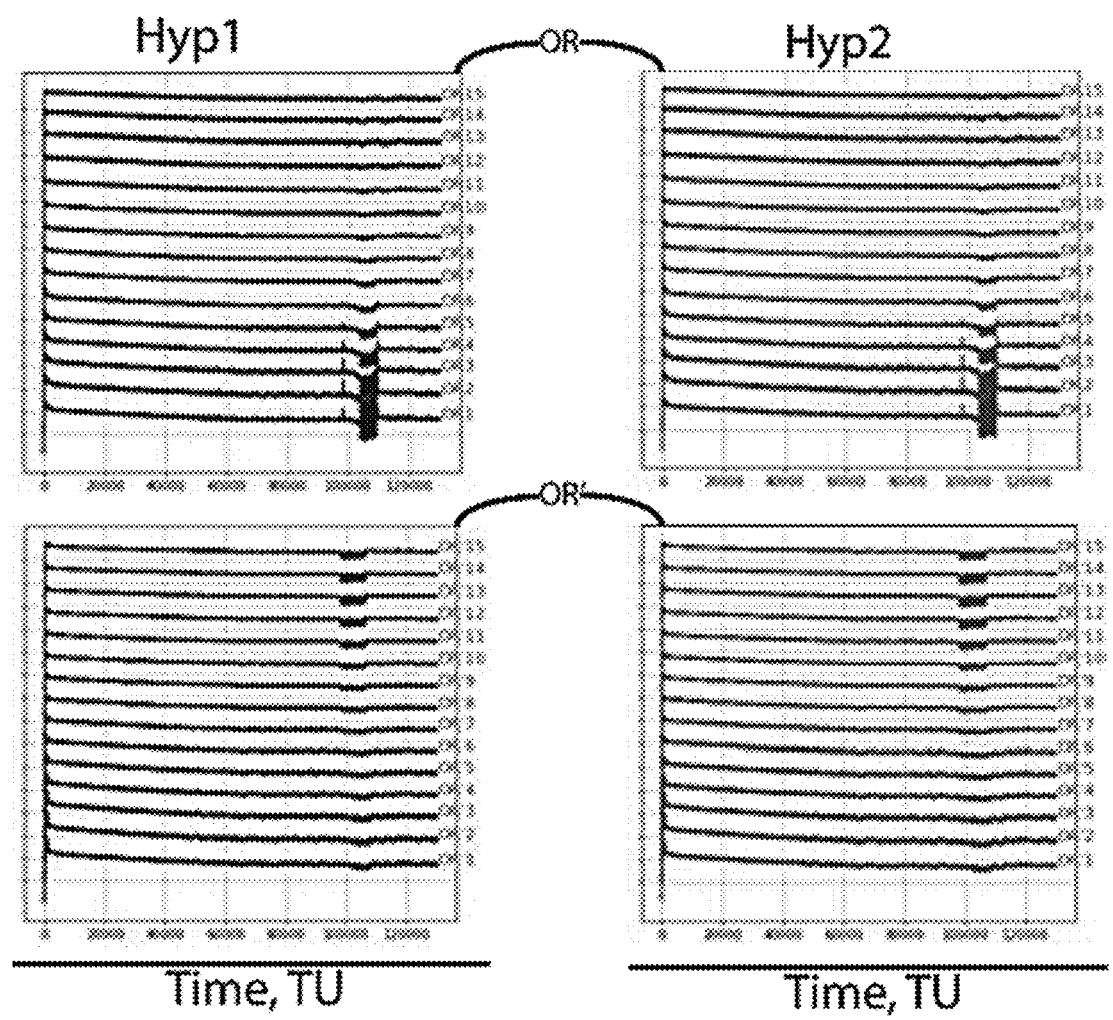
FIGS. 6A, 6B and 6C illustrate the signals and the localisation of the recommended electrodes OR and OR'.
Figure 6B:
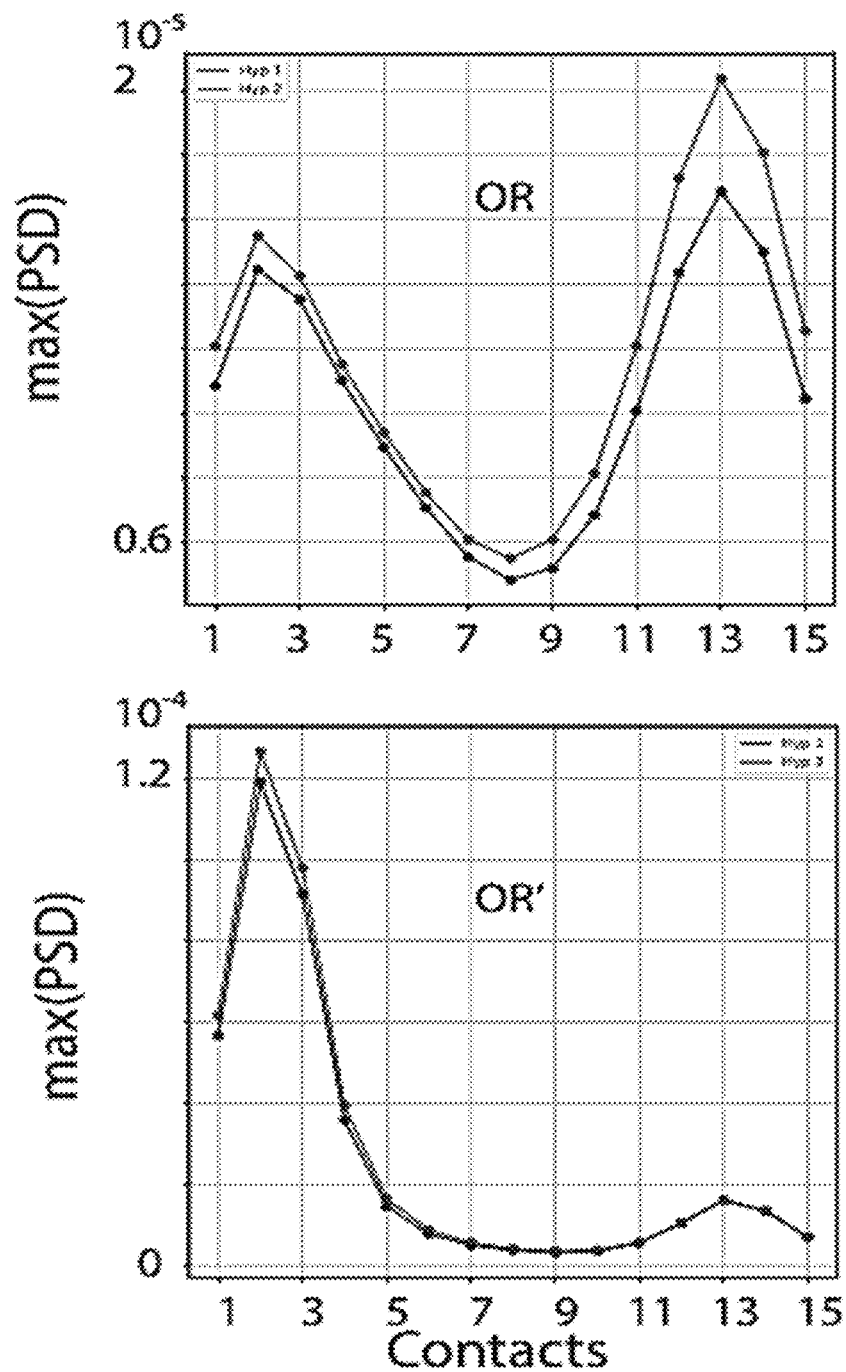
Figure 6C:
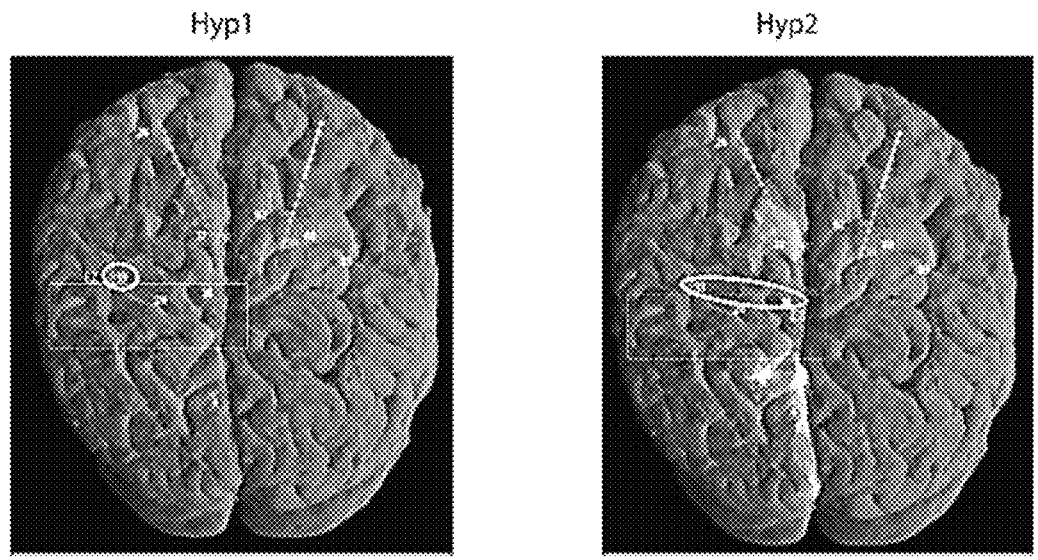

Signals of the electrode A' are with high frequency as shown in FIG. 6A, 6B but are not related to seizures, confirming then that using the metric Power Spectrum Density may be not enough to optimize the electrodes implantation. On the other hand, when looking at the signals of the electrode TB' of set 2, there are no seizures. It is noted that TB' is the best electrode of the set 2, therefore neither of signals of the set 2 show seizures. A detailed analysis of the results is provided when exploring the gain matrix and seizures propagation.

Necessary Electrodes

The electrodes H' and OF' are the first two electrodes of the set $E_1$. The sensor signals of the electrodes H' and OF' for hypotheses 1 (FIG. 4A) are different from those of the hypothesis 2 (FIG. 4B). They could then provide a good distinction between the both hypotheses 1 and 2, and consequently they would be considered as necessary. With the matrices $R_{H'}$ and $R_{OF'}$ it could be explained the sensor signals of the electrodes H' and OF', where each electrode i is associated to a matrix $R_i$. The rows of $R_i$ consists of the index of regions resulting from the sort of the gain matrix G elements. The associated matrices $R^{H'}$ and $R_{OF'}$ are given by:

$$R_{B'} = \begin{bmatrix} 36 & 9 & 40 & 15 & 39 \\ 36 & 40 & 9 & 15 & 39 \\ 36 & 40 & 9 & 15 & 39 \\ 36 & 40 & 33 & 15 & 39 \\ 40 & 36 & 33 & 15 & 339 \\ 33 & 40 & 36 & 15 & 39 \\ 33 & 40 & 36 & 15 & 1 \\ 33 & 40 & 1 & 29 & 15 \\ 33 & 1 & 29 & 40 & 14 \\ 33 & 1 & 29 & 14 & 40 \\ 33 & 1 & 29 & 14 & 8 \\ 33 & 1 & 29 & 14 & 30 \\ 33 & 1 & 29 & 14 & 30 \\ 1 & 33 & 29 & 14 & 30 \\ 1 & 33 & 29 & 14 & 30 \end{bmatrix},$$

-continued $$R_{OF'} = \begin{bmatrix} 37 & 38 & 39 & 2 & 42 \\ 37 & 38 & 39 & 34 & 2 \\ 37 & 38 & 39 & 34 & 2 \\ 37 & 38 & 34 & 39 & 17 \\ 38 & 37 & 34 & 39 & 17 \\ 34 & 38 & 39 & 17 & 39 \\ 34 & 17 & 38 & 37 & 39 \\ 17 & 34 & 38 & 39 & 37 \\ 17 & 34 & 38 & 29 & 33 \\ 17 & 34 & 29 & 38 & 33 \\ 17 & 34 & 29 & 33 & 38 \\ 17 & 29 & 34 & 33 & 23 \\ 17 & 29 & 34 & 33 & 23 \end{bmatrix}$$

It is noted that the sizes of the matrices $R_{H'}$ and $R_{OF'}$ Which are respectively (15×5) and (10×5), where the rows number corresponds to the sensors number of each of the two electrodes.

Each of the matrix $R_{H'}$ rows comprises at least one of the regions indexed by 33 and 36, which form both the epileptogenic zone of hypothesis 2. Hypothesis 1 has as epileptogenic zone the region indexed by 33, which is noted by region (33). Unlike $R_{H'}$, only the last rows of the matrix $R_{OF'}$ contain the region (33) whereas the first rows of $R_{OF'}$ include the region (37) related to seizure propagation (see $Q_{Hyp2}$).

Combining the matrices $R_{H'}$ and $R_{OF'}$, with the indexed regions (33, 36, and 37), it is possible to explain why for the hypotheses 1 and 2 some sensor signals of the electrodes H' and OF' show seizures and do not for the others.

First, sensor signals of the electrodes H' and OF' show seizures only when the corresponding rows of $R_{H'}$ and $R_{OF'}$ contains one of the indexed regions (33, 36, 37) in FIGS. 4A and 4B.

Also, sensor signals of the electrodes H' and OF' are with more apparent seizures if the indexed regions (33, 36, or 37) are in the first column of the corresponding rows of the matrices $R_{H'}$ and $R_{OF'}$ respectively. FIG. 4D demonstrates a 3D visualization of the electrodes H' and OF' positions with respect to the regions (33, 36, and 37).

The power evolution of signals with seizures for the both hypotheses could be explained and measured by the $PSD_M$ values as shown in FIG. 4C, and better with the gain matrix values as shown in FIG. 4, the gain matrix values depending on sensors.

Importantly, the shape of H' and OF' signals with seizures is different and the time onset as well as shown in FIGS. 4A and 4B. The shape depends on the first column found in the corresponding rows of the matrices RH' and ROF'. Each obtained index is associated to a signal at source level as shown in FIGS. 3A and 3B (B1, B2), which had the same shape as the corresponding sensor signal.

Recommended Electrodes

Figure 5A:
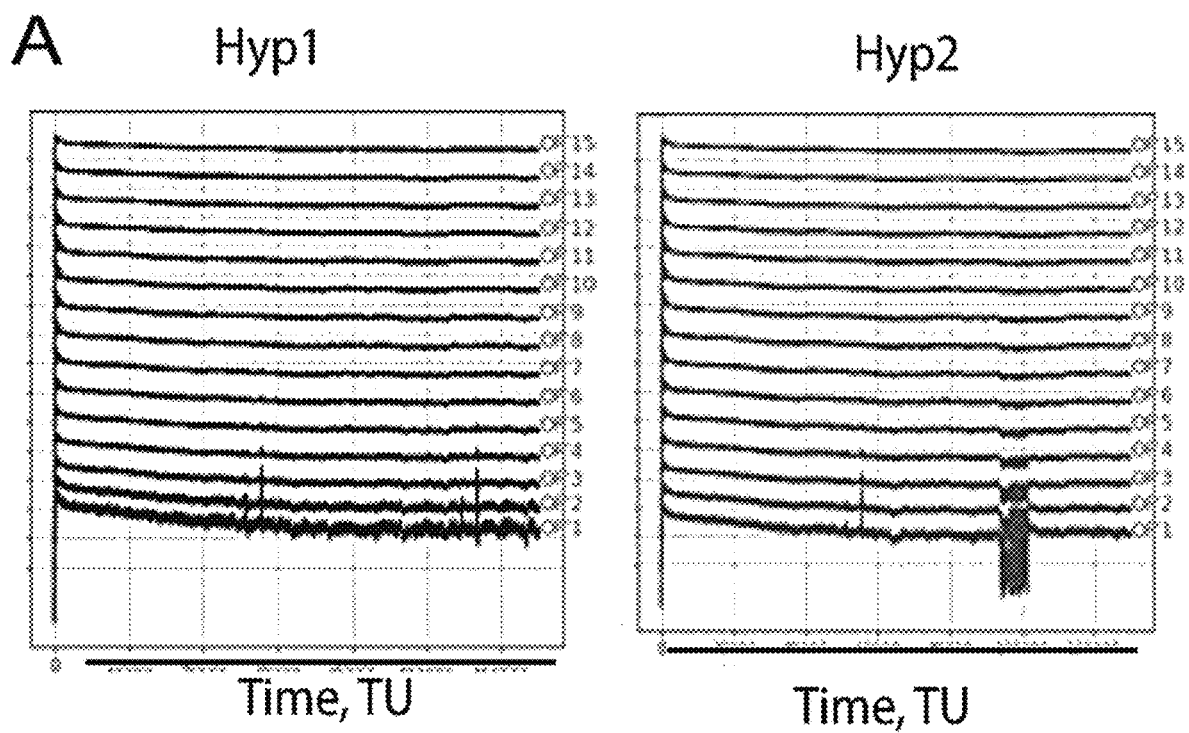
FIGS. 5A, 5B and 5C illustrate the localization and the signals of the necessary electrode OF' according to the invention.
Figure 5B:
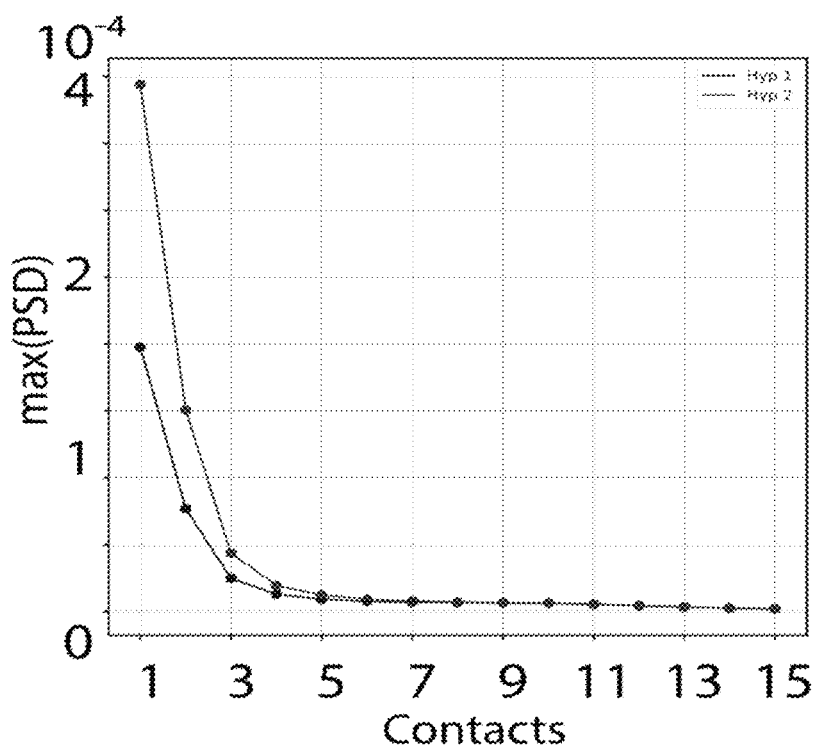
Figure 5C:
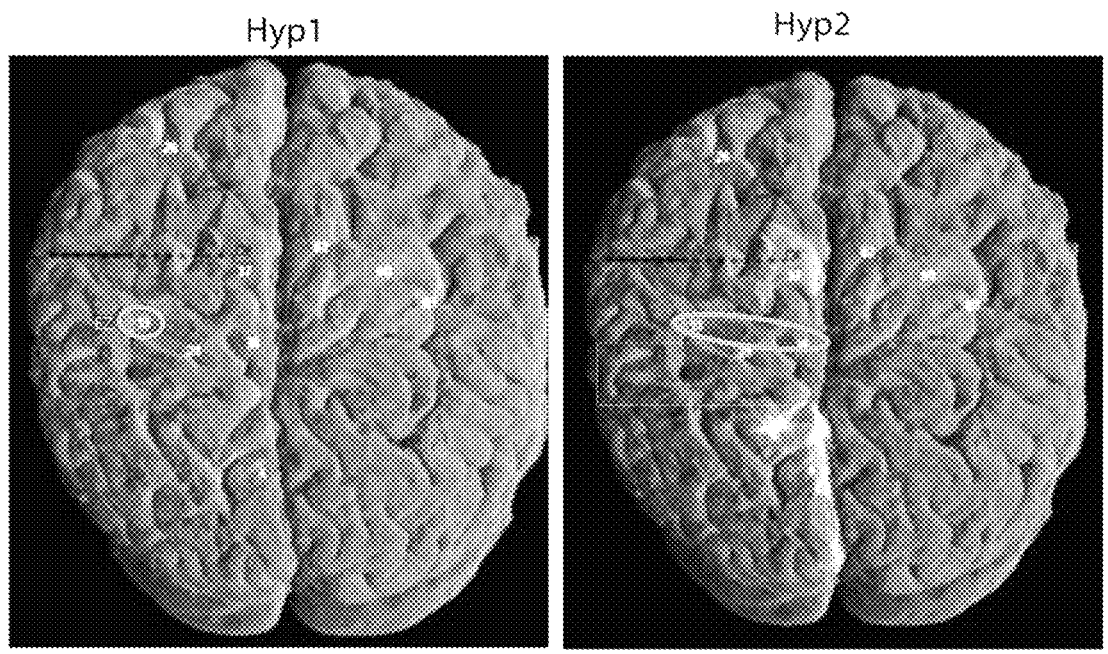

The OR and OR' electrodes are the last two electrodes of the set $E_1$, with sensor signals showing seizures. The OR signals look similar for both hypotheses 1 and 2 as shown in FIGS. 5A, 5B. This similarity of signals, which was also observed for the electrode OR', does not occur for the necessary electrodes H' and OF'. Therefore, with the sensors signals of OR and OR', no distinction was performed between the hypotheses 1 and 2, on the contrary of H' and OF'. It was then suggested to consider these two electrodes OR and OR', although they indicate the presence of seizures.

The power of the OR signals is the same for both hypotheses 1 and 2, which is represented by the dark-grey and light-grey curves respectively where each one consists of $PSD_M$ values as shown in FIG. 5C. The dark- and light-grey curves associated to the electrode OR' are not superimposed as shown in FIG. 5C, but nevertheless they are with a same shape which then explains the signals similarity of the hypotheses 1 and 2 (FIG. 5A, FIG. 5B. The $PSD_M$ values for the both electrodes OR and OR' are increased as shown in FIG. 5C as seizures more appeared (FIGS. 5A, 5B).

To explore this similarity, the concept of seizure propagation was used, by analyzing the elements of the matrices $R_{OR}$ and $R_{OR'}$ given by:

$$R_{OR} = \begin{bmatrix} 60 & 62 & 49 & 13 & 81 \\ 60 & 62 & 74 & 49 & 13 \\ 60 & 62 & 74 & 49 & 13 \\ 60 & 62 & 74 & 25 & 49 \\ 60 & 74 & 62 & 25 & 49 \\ 60 & 74 & 62 & 25 & 67 \\ 74 & 00 & 62 & 75 & 25 \\ 74 & 75 & 60 & 62 & 25 \\ 75 & 74 & 60 & 68 & 25 \\ 75 & 74 & 68 & 60 & 67 \\ 75 & 74 & 68 & 67 & 60 \\ 75 & 74 & 68 & 67 & 76 \\ 75 & 74 & 68 & 76 & 67 \\ 75 & 76 & 68 & 74 & 67 \\ 75 & 76 & 68 & 74 & 67 \end{bmatrix},$$

$$R_{OR'} = \begin{bmatrix} 13 & 11 & 62 & 25 & 42 \\ 13 & 11 & 25 & 62 & 42 \\ 13 & 11 & 25 & 62 & 74 \\ 13 & 11 & 25 & 62 & 74 \\ 25 & 13 & 11 & 62 & 74 \\ 25 & 11 & 13 & 74 & 62 \\ 25 & 11 & 13 & 74 & 26 \\ 25 & 11 & 26 & 13 & 74 \\ 25 & 26 & 11 & 74 & 13 \\ 26 & 25 & 11 & 74 & 2 \\ 26 & 255 & 2 & 74 & 19 \\ 26 & 25 & 2 & 27 & 19 \\ 26 & 27 & 2 & 25 & 19 \\ 26 & 27 & 2 & 25 & 19 \\ 26 & 27 & 2 & 19 & 3 \end{bmatrix}$$

which are associated respectively to the electrodes OR and OR'.

Unlike the matrices $R_{H'}$ and $R_{OF'}$, whose elements could be one of the indexed regions (33, 36, 37), the matrix $R_{OR}$ contains two regions from the set $Q_{com}$ indexed by 60 and 62. It is noted that the set $Q_{com}$ contains the common regions between the two sets $PZ_1$ and $PZ_2$. In other words, these regions are recruited during the evolution of the epileptic activity for both hypotheses 1 and 2. FIGS. 5A, 5B show that sensors signals of the electrode OR are with seizures when the first column of the corresponding rows of the matrix $R_{OR}$ is one of the indexed regions 60 and 62.

With the matrix $R_{OR'}$, it is demonstrated why it is advantageous to focus on the first column of the matrix $R_i$ to make a link to seizures shape observed in the electrode i signals. In fact, looking at the columns of the matrix $R_{OR'}$ in which the region indexed by 60 is placed, it was observed that the signals are with no apparent seizures as soon as the region (60) is not in the first column. Also, the last rows of $R_{OR'}$ start with the region (26) which belongs as the region (60) to the set $Q_{com}$ providing then a proof of the OR' signals similarity as shown in FIGS. 5A, 5B, and the concept of seizure propagation.

As the electrodes H' and OF', the time of onset seizures is different between the electrodes OR and OR'. This is demonstrated with the matrices $R_{OR}$ and $R_{OR}'$ that contain at the first columns the regions 60 and 26 respectively which show signals at source level with different times of onset seizures.

The Predictive Capacity of the Virtual Brain Using Seizure Propagation

The third ordered element of the set $E_1$ including the best electrode positions is the electrode A' with $R_{A'}$ matrix given by:

$$R_{A'} = \begin{bmatrix} 41 & 5 & 40 & 39 & 38 \\ 41 & 5 & 40 & 39 & 38 \\ 41 & 5 & 40 & 39 & 38 \\ 41 & 5 & 40 & 39 & 34 \\ 41 & 5 & 40 & 34 & 39 \\ 41 & 5 & 34 & 40 & 29 \\ 29 & 41 & 34 & 5 & 14 \\ 29 & 14 & 34 & 41 & 5 \\ 29 & 14 & 34 & 41 & 8 \\ 29 & 14 & 34 & 8 & 33 \\ 29 & 14 & 8 & 34 & 33 \\ 29 & 14 & 8 & 34 & 33 \\ 14 & 29 & 8 & 34 & 33 \\ 14 & 29 & 8 & 33 & 34 \\ 14 & 29 & 8 & 33 & 34 \end{bmatrix}$$

Only final rows of the matrix $R_{A'}$ contain the region (33), but ordered at the end whence the last sensors signals do not show apparent seizures as show in FIGS. 6A, 6B. On the opposite, first sensors signals of A' are with a strong power as shown in FIG. 6C, $PSD_M$, but nevertheless they do not show seizures. In fact, the corresponding rows of $R_{A'}$ start with the region (41) which is not one of the regions related to the epileptogenic zones and seizure propagation. Mathematically, the region (41) does not belong to one of the following sets: $Q_{Hyp1}$, $Q_{Hyp2}$, and $Q_{com}$. It could b concluded with all electrodes of the set $E_1$, that the Power Spectrum Density is not enough as a metric. Determining the useful electrodes goes with the Virtual Brain through knowing where seizures spread across the brain.

No Helpful Electrodes

Figure 7A:
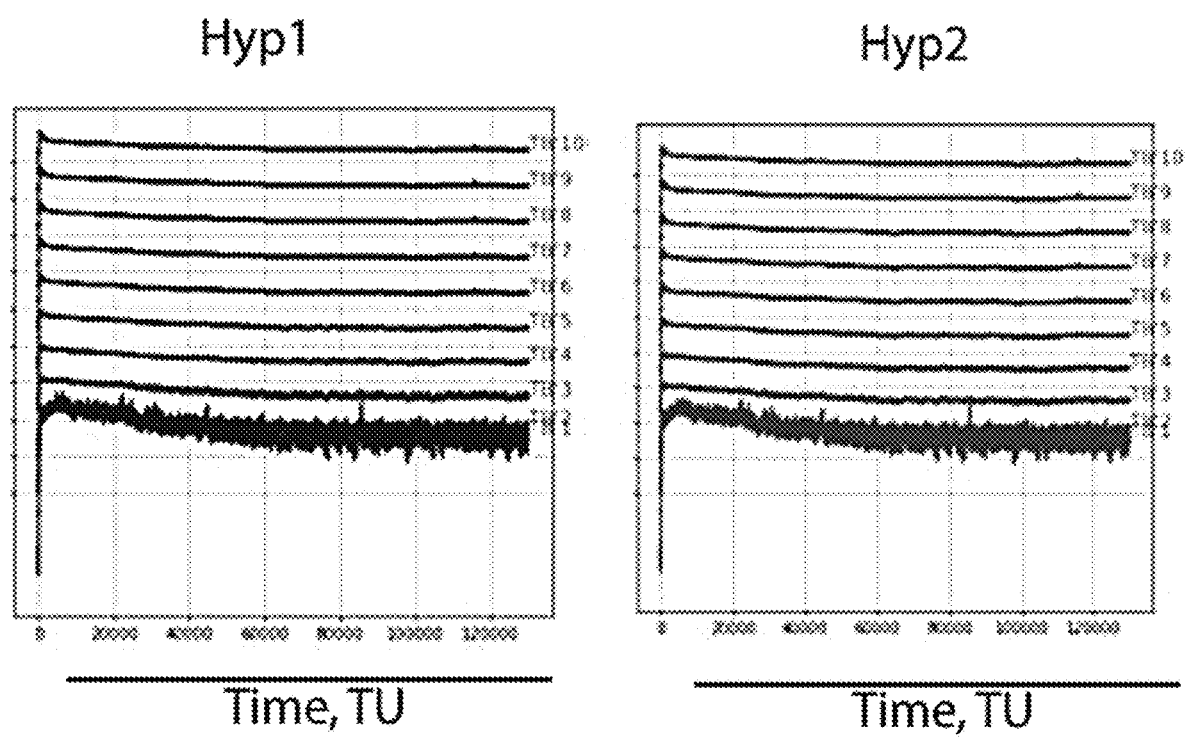
FIGS. 7A, 7B and 7C illustrate the signals and the localisation of the unnecessary electrode TB'.
Figure 7B:
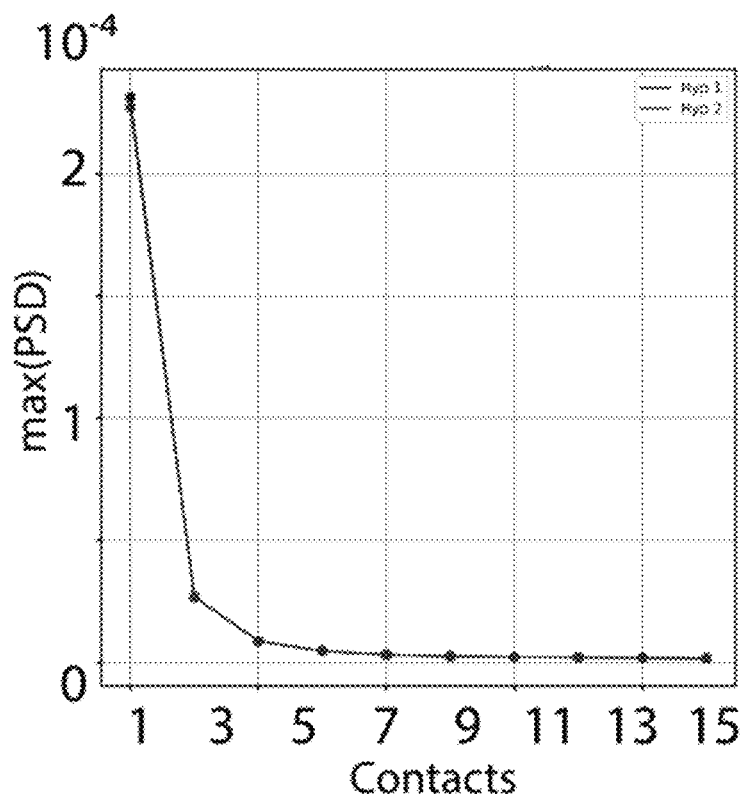
Figure 7C:
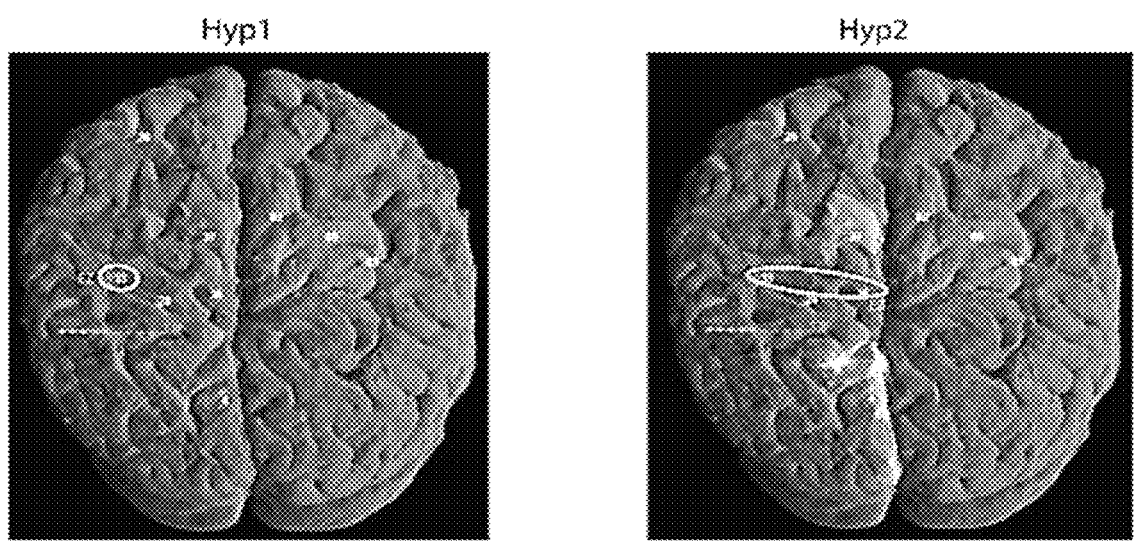
Figure 8A:
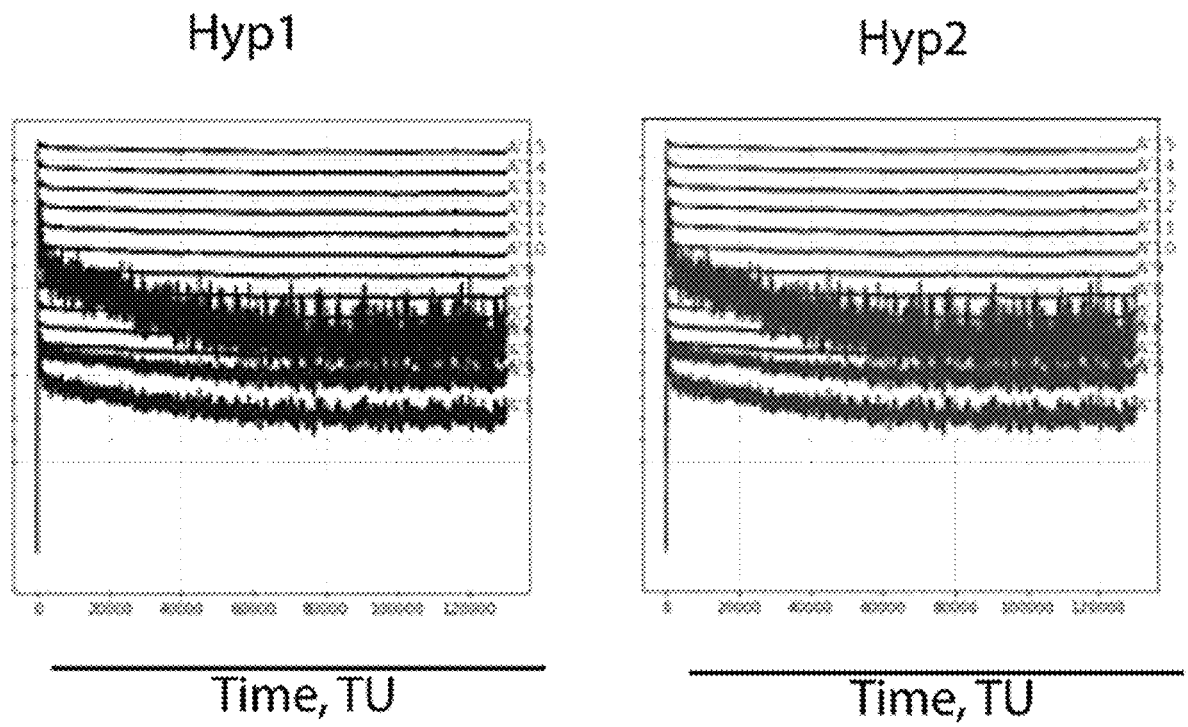
FIGS. 8A, 8B and 8C illustrate the signals and the localisation of the unnecessary electrode A'.
Figure 8B:
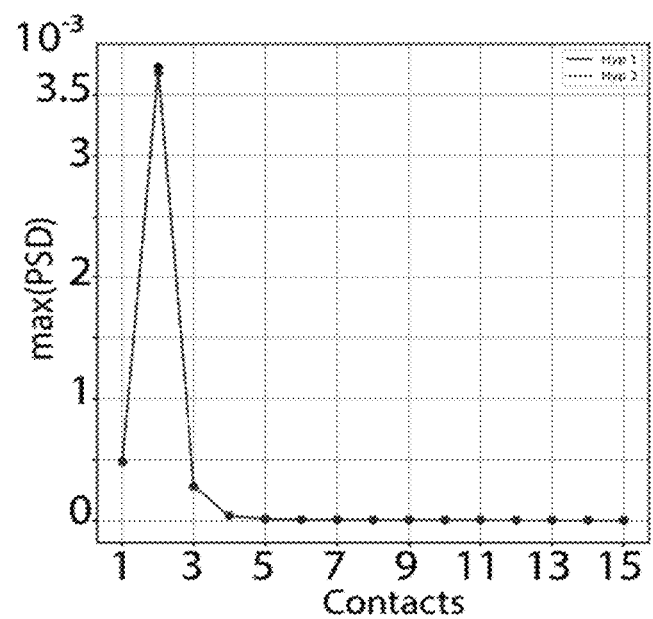
Figure 8C:
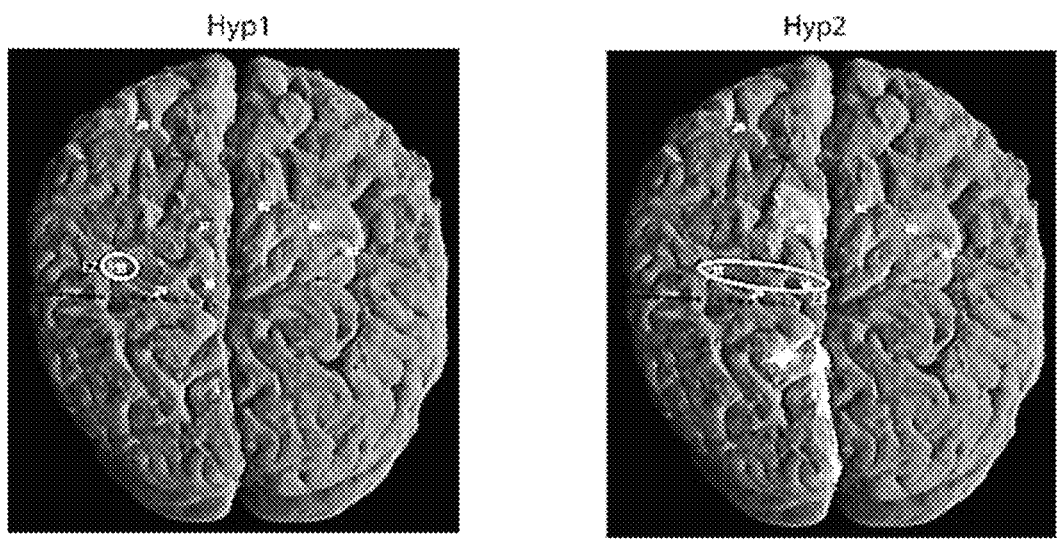
Figure 9A:
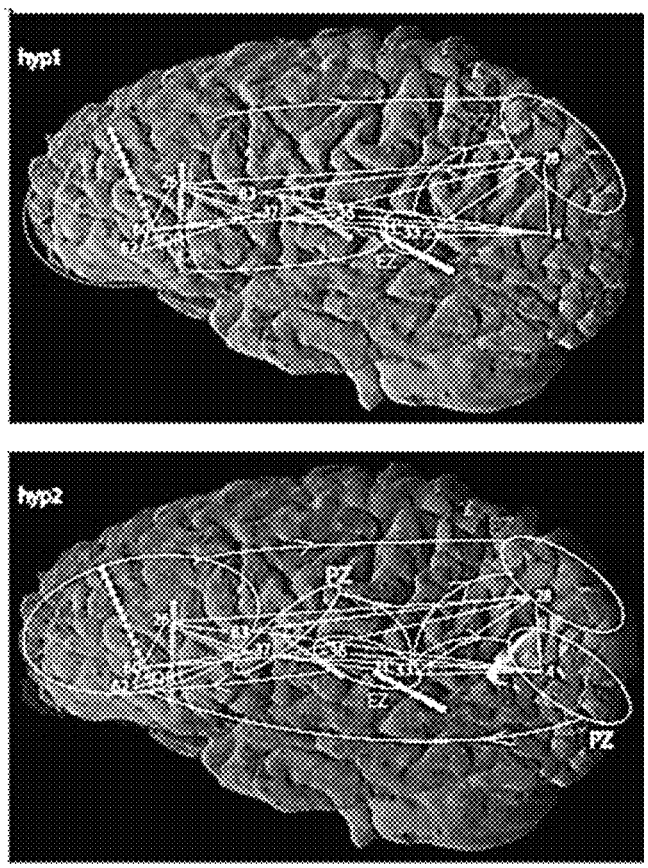
FIGS. 9A and 9B illustrate the organizing of the implant electrodes after optimization according to the invention.
Figure 9B:
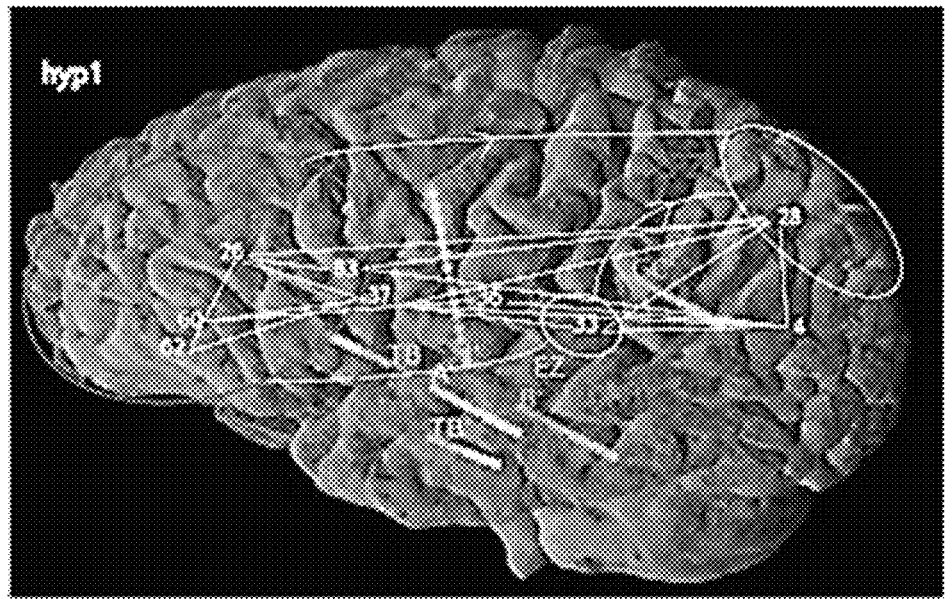
Figure 9B:
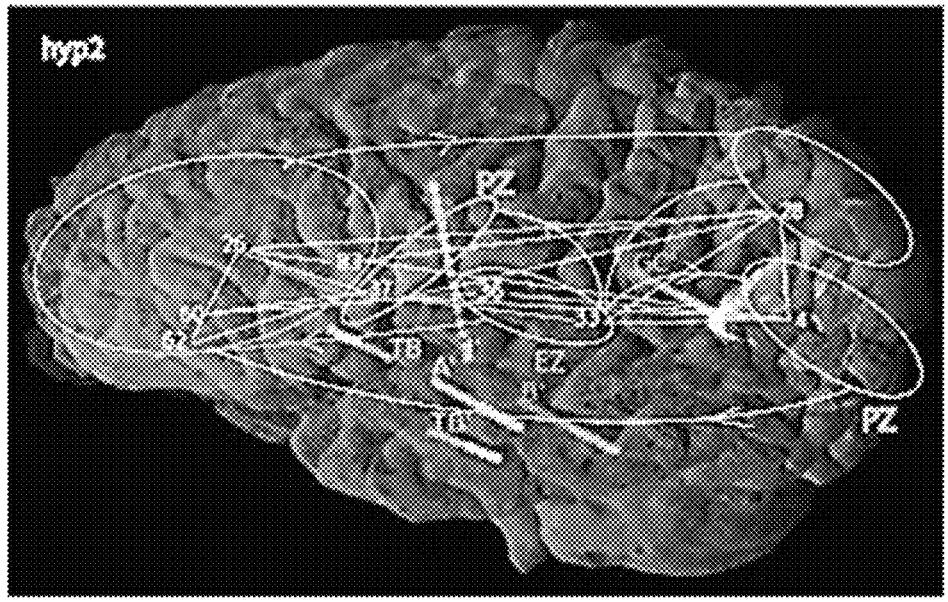

Signals of the electrode TB' ordered first in the set $E_2$ do not show seizures as shown in FIGS. 7A, 7B. The 3D position of the electrode TB' is shown in FIG. 7D. The matrix $R_{TB'}$ given by:

$$R_{TB'} = \begin{bmatrix} 5 & 4 & 132 & 40 & 15 \\ 5 & 41 & 32 & 40 & 15 \\ 5 & 41 & 32 & 40 & 14 \\ 5 & 41 & 32 & 14 & 8 \\ 5 & 14 & 32 & 41 & 8 \\ 14 & 5 & 8 & 29 & 32 \\ 4 & 8 & 29 & 5 & 32 \\ 14 & 29 & 8 & 5 & 32 \\ 14 & 29 & 8 & 5 & 32 \\ 14 & 29 & 8 & 5 & 32 \end{bmatrix}$$

does not contain an indexed region related to the epileptogenic zone or seizure propagation, explaining therefore the TB' signals patterns. The corresponding PSD values are shown in figure FIG. 7C.

The invention claimed is:

1. A method of optimizing an intracranial implantation of a set of electroencephalographic electrodes for identification of an epileptogenic zone in an epileptic patient's brain, comprising:

providing a model of an epileptogenic zone and a model of propagation of an epileptic discharge from the epileptic zone to a propagation zone, and loading the models in a computerized platform modelling various zones or nodes of a primate brain and connectivity between the zones or nodes, the models describing an onset, a time-course and an offset of epileptic discharges, and personalizing the computer platform using structural data of the epileptic patient's brain to obtain a personalized computerized patient's brain;

providing at least one hypothesis of localization of the epileptogenic zone in the epileptic patient's brain;

for the at least one hypothesis of localization of the epileptogenic zone, simulating, in the personalized computerized patient's brain, epileptic seizures, and determining, for the at least one hypothesis and the epileptic seizures, a network of propagation zones;

for a plurality of intracranial implantation schemes of electroencephalographic electrodes, defining virtually a number and a placement of implanted electrodes, obtaining, using the personalized computerized patient's brain, simulated electroencephalographic signals activity that is to be measured by electroencephalographic electrodes implanted according to the plurality of intracranial implantation schemes; and determining, from the plurality of intracranial implantation schemes, an optimized intracranial implantation scheme of the electroencephalographic electrodes using a metric measuring a difference between simulated electroencephalographic signals activity for the plurality of intracranial implantation schemes, and implanting electrodes of the set of electroencephalographic electrodes in the epileptic patient's brain, the electrodes being configured for identification of the epileptogenic zone in the epileptic patient's brain, the electrodes being arranged according to the optimized intracranial implantation scheme.

2. The method of claim 1, wherein the model of the epileptic discharge from the epileptogenic zone to the propagation zone is defined by a set of equations that depends on a parameter x0, the parameter x0 being proportional to an excitability of a node within the model, and wherein the epileptogenic zone is parametrized using such parameter.

3. The method of claim 2, wherein the hypothesis of the localization of the epileptogenic zone is a clinical hypothesis.

4. The method of claim 2, wherein a plurality of hypotheses of the localization of the epileptogenic zone in the patient brain is provided.

5. The method of claim 2, wherein the metric is power density spectrum.

6. The method of claim 2, wherein the electrodes of an implantation scheme are virtually placed one by one in the computerized platform and simulations and optimization are carried out after each electrode placement.

7. The method of claim 1, wherein the hypothesis of the localization of the epileptogenic zone is a clinical hypothesis.

8. The method of claim 3, wherein a plurality of hypotheses of the localization of the epileptogenic zone in the patient brain is provided.

9. The method of claim 3, wherein the metric is power density spectrum.

10. The method of claim 7, wherein all the electrodes of an implantation scheme are virtually placed in the computerized platform before simulation and optimization.

11. The method of claim 1, wherein a plurality of hypotheses of the localization of the epileptogenic zone in the patient brain is provided.

12. The method of claim 11, wherein the metric is power density spectrum.

13. The method of claim 1, wherein the metric is power density spectrum.

14. The method of claim 1, wherein the electrodes of an implantation scheme are virtually placed one by one in the computerized platform and simulations and optimization are carried out after each electrode placement.

15. The method of claim 1, wherein all the electrodes of an implantation scheme are virtually placed in the computerized platform before simulation and optimization.

16. The method of claim 1, wherein, to obtain the simulated electroencephalographic signals, a source level analysis of seizure propagation is carried out.

17. The method of claim 1, wherein simulated electroencephalographic signals are performed for each hypotheses after defining the number of implanted electrodes and their placement using the following linear system $$Y = G*S$$

where G is a gain matrix that relates the sources activity S with an observed sensors activity Y, and depends on electrodes positions.

18. The method of claim 1, wherein a signal vector is calculated for each electrode of a scheme that takes into account the number of sensors of said electrode.

19. The method of claim 1, for each scheme among the plurality of intracranial implantation schemes, further comprising differentiating necessary electrodes from unnecessary electrodes, and optimizing the scheme by removing, from the scheme, the unnecessary electrodes.

* * * * *